United States Patent
Haire et al.

(10) Patent No.: US 8,177,289 B2
(45) Date of Patent: May 15, 2012

(54) METHOD AND APPARATUS FOR IMPROVING THE DAMAGE-RESISTANCE OF CONTAINER BODY TOP RAILS

(75) Inventors: Andrew Ralph Haire, Thomasville, NC (US); Russell Evan Cayse, Ballwin, MO (US)

(73) Assignee: Enterprise Holdings, Inc., St. Louis, MO (US)

( * ) Notice: Subject to any disclaimer, the term of this patent is extended or adjusted under 35 U.S.C. 154(b) by 60 days.

(21) Appl. No.: 12/724,146

(22) Filed: Mar. 15, 2010

(65) Prior Publication Data

US 2011/0221232 A1 Sep. 15, 2011

(51) Int. Cl.
B62D 33/04 (2006.01)
(52) U.S. Cl. .................................................. 296/182.1
(58) Field of Classification Search ................ 296/182.1, 296/185.1, 186.1, 29
See application file for complete search history.

(56) References Cited

U.S. PATENT DOCUMENTS

| | | | |
|---|---|---|---|
| 708,723 A | 9/1902 | Mathis | |
| 2,991,116 A | 7/1961 | Andrews | |
| 3,027,187 A | 3/1962 | Rivers | |
| 3,192,377 A | 6/1965 | Abolins | |
| 3,196,267 A | 7/1965 | Abolins | |
| 3,353,863 A | 11/1967 | Koot | |
| 3,582,640 A * | 6/1971 | Ellard | 362/493 |
| 4,065,168 A | 12/1977 | Gregg | |
| 4,947,293 A | 8/1990 | Johnson et al. | |
| 5,098,115 A | 3/1992 | Haire et al. | |
| 5,122,933 A | 6/1992 | Johnson | |
| 5,143,416 A | 9/1992 | Karapetian | |
| 5,338,050 A | 8/1994 | Haire et al. | |
| 5,407,221 A | 4/1995 | Haire et al. | |
| 5,483,427 A | 1/1996 | Dealey, Jr. et al. | |
| 5,795,051 A | 8/1998 | Galanski | |
| 5,934,741 A | 8/1999 | Beukers et al. | |
| 5,934,849 A | 8/1999 | Haire | |
| 6,106,205 A | 8/2000 | Haire | |
| 6,152,586 A | 11/2000 | Dealey, Jr. et al. | |
| 6,165,588 A | 12/2000 | Wycech | |
| 6,224,125 B1 | 5/2001 | McCormack | |
| 6,238,068 B1 | 5/2001 | Farmer, Jr. | |
| 6,290,285 B1 | 9/2001 | McCormack | |
| 6,585,202 B2 | 7/2003 | Broccardo et al. | |
| 6,742,974 B2 | 6/2004 | Haire | |
| 7,237,932 B2 | 7/2007 | Ter-Hovhannissian | |
| 2004/0201204 A1 | 10/2004 | Haire | |
| 2004/0202533 A1 | 10/2004 | Haire | |
| 2007/0206386 A1 | 9/2007 | Ehrlich et al. | |

FOREIGN PATENT DOCUMENTS

EP 0270328 A2 6/1988

OTHER PUBLICATIONS

Web page (printed Oct. 24, 2011)—http://www.matweb.com/reference/compressivestrength.aspx.*

* cited by examiner

Primary Examiner — H Gutman
(74) Attorney, Agent, or Firm — Thompson Coburn LLP

(57) ABSTRACT

Various embodiments of an improved top rail for a container body, e.g. a truck body, are disclosed. In exemplary embodiments, a support structure is disposed at least partially within a channel of the top rail to provide increased strength to the top rail and to protect the top rail and container body from damage. Examples of support structures include support blocks, such as composite blocks, and support rails, such as metal rails. In an exemplary embodiment, a low-profile light source can be installed on the top rail and/or the support structure.

47 Claims, 40 Drawing Sheets

METHOD AND APPARATUS FOR IMPROVING THE DAMAGE-RESISTANCE OF CONTAINER BODY TOP RAILS

FIELD OF THE INVENTION

The present invention is generally directed toward the field of container body design, particularly the design of a top rail for container bodies found on cargo vehicles such as trucks and tractor-trailers.

BACKGROUND AND SUMMARY OF THE DISCLOSURE

The top rail for a container body is a structure that connects the container body roof to the container body side wall. The term "container body" is used herein to refer to an enclosed structure for the transportation of objects. Examples of container bodies include vehicle container bodies, such as truck container bodies, truck van bodies and tractor-trailer container bodies. While the drawings herein use a truck container body to illustrate embodiments of the invention, it should be understood that the improved top rail designs disclosed herein may be applied to a variety of other container bodies.

Using the exemplary truck body 111 of FIG. 1 as an example, top rail 100 is installed where the truck roof 101 connects to the truck sidewall 103. Using a frame of reference from the perspective of the truck, the truck's length 105 extends from the front to the rear of the truck, the truck's height 107 generally extends from the wheels to the roof, and the truck's width 109 extends in a direction corresponding to a sidewall-to-sidewall direction (e.g., left to right). Thus, for a truck under normal operating conditions, as used herein, (1) the vertical dimension corresponds to the truck's height 107 (thus, the upward direction is toward the sky and the downward direction is toward the road), (2) the horizontal dimension corresponds to the truck's length 105, and (3) the lateral dimension corresponds to the truck's width 109. Thus, it can be seen that the longest dimension of the top rail 100 extends horizontally along the truck's length. A typical truck body 111 comprises two top rails 100, one on the left side and one on the right side of the truck.

FIGS. 1A, 1B and 1C depict detailed views (a side view, perspective view and cross-sectional view, respectively) of a conventional top rail 100 for a container body such as exemplary truck container body 111. Exemplary top rail 100 comprises a top lip 102, a "C"-shaped cavity channel 104, channel wall 106, channel bottom 108, and a bottom wall 110.

As shown in FIGS. 1 and 1A-1C, the container body roof 101 is affixed to the top lip 102 of the top rail 100 via a plurality of rivets 113. Often, a "J"-shaped piece of metal 117 is installed over the roof 101 and top lip 102, and rivets 113 extend through the "J"-shaped piece 117, roof 101 and top lip 102 to hold the roof 101 securely in place. Also, a bottom wall 110 of the top rail is typically affixed to the side wall 103 of the container body via rivets 115, as shown in FIG. 1A. As such, it should be understood that the top rail 100 effectively interconnects the container body roof 101 and container body sidewall 103.

Top rail 100 also includes a bottom lip 108 below the top lip 102, wherein the bottom lip 108 extends laterally outward in a direction substantially perpendicular to the channel wall 106. Thus, together, the top lip 102, channel wall 106 and bottom lip 108 define an open cavity or channel 104 that extends in the horizontal direction along the length of the top rail 100. Typically, marker lights 112 are affixed to channel wall 106 inside this channel 104, as shown in FIGS. 1 and 1A-1C.

Bottom wall 110 extends downwardly from an outer portion of the bottom lip 108 in a direction substantially perpendicular to the bottom lip 108. The truck sidewall 103 is affixed to this bottom wall 110. Typically, sidewall 103 is affixed to bottom wall 110 via rivets 115.

Optionally, a plurality of support members (not shown) such as beams may extend horizontally between the truck sidewalls at spaced intervals to support the container body roof 101. Such support members would abut the upper part of the inward face of the channel wall depicted in FIGS. 1A-C. Also, optionally, a plurality of support members (not shown) such as posts may extend vertically from the bottom of the container body to the bottom face of bottom lip 108 at spaced intervals to brace the container body sidewall 103.

FIGS. 1D-1F show various exemplary prior art top rail designs in isolation (e.g. prior to installation on a container body). As shown in FIGS. 1D-1F, such top rails 100 may take various shapes and sizes. As shown in FIGS. 1B-1F, top lip 102 of the top rail 100 laterally extends in a direction substantially perpendicular to the container body sidewall 103. As shown in FIGS. 1B-1F, a portion 120 of the top lip 102 laterally extends outward from channel wall 106. Another portion 122 of the top lip 102 laterally extends inward from the channel wall 106. Container body roof 101 is typically affixed to the outward-extending portion 120 of top lip 102, as shown in FIGS. 1B and 1C. As shown in FIGS. 1E-1F, the inward-extending portion 122 may be very small relative to outward-extending portion 120. It is also possible that top lip 102 does not include an inward-extending portion 122.

As shown in FIGS. 1D-1E, top rail 100 also typically includes a roof bow support ledge 124. Typically, as explained above, a plurality of support members such as roof bow supports are used to support the container body roof 101, and roof bow support ledge 124 can further support these roof bow supports.

As shown in FIGS. 1D and 1F, top rail 100 may optionally comprise a wire guide 126. Wiring for lights 112 can be routed through the wire guide 126. As shown in FIG. 1F, top rail 100 may comprise a flange 128 that provides a groove for wiring. As shown in FIG. 1G, the marker lights 112 may comprise low-profile light emitting diode (LED) lights 112 mounted in channel 104.

Top rails are typically formed as a single piece of metal. For example, a typical top rail 100 may comprise a single piece of extruded aluminum. However, other metals could be used, for example stainless steel. Also, the top rail need not be formed from a single piece of extruded metal as top rails may optionally be formed by welding multiple pieces of metal together. Moreover, materials other than metal could be used for the top rail. For example, fiberglass or other similar materials may be used.

The inventors believe that the prior art top rail design depicted in FIGS. 1 and 1A-1G are unduly susceptible to damage, particularly with respect to damage resulting from impacts that strike the top rail 100 from above, e.g. damage from tree branch strikes. The inventors believe that this problem is especially pronounced in connection with delivery trucks because delivery trucks must often deliver cargo (e.g., packages) to residential areas. Because residential streets tend to be relatively narrow and more tree-lined than thoroughfares such as highways, tree branch strikes to the top rails of residential delivery trucks are relatively common. The top rail design shown in FIGS. 1A-1G is susceptible to denting and/or downward bending of the top lip into the channel 104 due to impacts such as tree limbs that strike the top lip at an angle. This damage to the top lip 102 can compromise the structural integrity of the truck's container body roof 101 because the bending/distortion of the top lip can cause corresponding bending/distortion in the truck's container body roof to which it is connected. Furthermore, this bending/distortion can cause one or more of the rivets 113 to come loose or become dislodged, which may compromise the integrity of the seal between the top rail and the container body roof 101. With such compromised integrity, there is an increased risk of water leaking into the container body, and water damage is of particular concern for trucks which haul goods, especially delivery trucks, because the water may cause extensive damage to the goods inside the truck container body. FIG. 1H depicts typical damage to a prior art top rail 100 that the inventors believe can occur as a result of strikes by objects against the prior art top rail. As can be seen, FIG. 1H shows that top lip 102 has been dented and bent downward due to object strikes.

Furthermore, with lights 112 such as those shown in FIGS. 1A-C and 1G placed in the open channel 104, the prior art top rail design also offers little protection for the lights 112 against a strike from an object (particularly a narrow object such as narrow portions of tree limbs), which can result in the lights being damaged or dislodged. In exemplary FIG. 1H, the lights are missing from the top rail to show that they have been sheared off by, for example, a tree branch strike.

The inventors note that the susceptibility of the prior art top rail design to these types of damage is especially problematic with respect to rentals of delivery trucks. To closely track potential damage to the rental trucks, the rental company needs to assess the top rail for damage at the start and/or conclusion of each rental. A failure to be vigilant about such inspections can lead to disputes with customers as to who is responsible for the costs to repair such damage. Thus, the rental company is placed in a position of expending its resources on closely monitoring rental truck top rails, which impacts the profitability and/or cost of the rental operation. Furthermore, upon inspection of the top rail, the rental company will not only need to decide whether any damage exists and but also decide whether such damage requires pulling that delivery truck out of the rental fleet for repair. Because the risk that damage to the top rail may compromise the water resistance of the interior of the truck's container body where goods are stored, it is often necessary to remove delivery trucks from the rental fleet for repair, which further impacts the profitability and costs for the rental operation.

It is against this backdrop that the inventors have developed an improved top rail design.

In an exemplary embodiment, the inventors herein disclose a top rail having a support structure disposed in the cavity channel to improve the ability of the top lip to resist damage caused by impacts. The term "support structure" is used herein to refer to a support block or support rail disposed at least partially in the channel of a top rail. The support structure supports and protects the top rail (especially the top lip) and the rooftop of a container body. The support structure must be sufficiently rigid to support the top rail against downward bending in response to the top rail being struck by tree limbs while in motion at typical driving speeds.

In an exemplary embodiment, the inventors herein disclose a top rail having a support block as the support structure. As used herein, the phrase "support block" refers to a block comprised of solid material. The phrase "support block" encompasses blocks having cavities or hollow portions so long as those cavities/hollow portions do not compromise the block's ability to reinforce the top rail against tree branch strikes. The solid material may comprise wood, metal, composite material (e.g. part wood and part synthetic material) or any combination of the above.

In another exemplary embodiment, the inventors herein disclose a top rail having a support rail as the support structure.

In another exemplary embodiment, the inventors herein disclose that the support structure is configured such that a portion of the support structure, when positioned in the top rail's channel, extends above the top lip.

In another exemplary embodiment, the inventors herein disclose a top rail wherein a low profile light source is used for illumination rather than the larger lights 112 of the prior art. This low profile light source may be positioned on a bottom portion of the top rail below the bottom lip, such as the bottom wall. The low profile light source may also be installed in or on the support structure. Furthermore, this low profile light source preferably comprises a plurality of LEDs. Due to the low profile nature of the light source according to these embodiments, the light source will not extend very far in the lateral direction away from the truck sidewall. The inventors believe that this reduced profile of the light source will improve its resistance to impacts that would tend to cause shearing damage to light sources with a larger profile. Preferably, this low profile light source is used in combination with the support structure within the channel such that the top rail can retain its illumination while still benefitting from the increased strength provided by the support structure within the channel.

In yet another exemplary embodiment, the inventors herein disclose a low profile light source that is installed in the immediate vicinity of one or more rivets which provide additional protection for the light source.

The inventors herein also disclose a method of improving a top rail, wherein the method comprises positioning a support structure within the open channel of the top rail and securing the support structure in position within the channel. In a retrofitting mode, this method preferably includes removing any pre-existing light source from the channel. Furthermore, this method preferably includes securing the low profile light source to the top rail.

FIGS. 1 and 1A-1H depict various prior art top rails. It will be understood throughout this application that the techniques disclosed herein for improving the damage-resistance of top rails are applicable to any of these top rail designs, as well as a wide variety of other existing or future top rail designs. While modifications may be necessary to accommodate certain aspects of specific top rail designs, the necessary modifications will be apparent upon review of this application.

These and other features and advantages of preferred embodiments of the present invention will be apparent to those having ordinary skill in the art upon review of the specification and drawings contained herein.

DETAILED DESCRIPTION OF THE PREFERRED EMBODIMENTS

Figure 1:
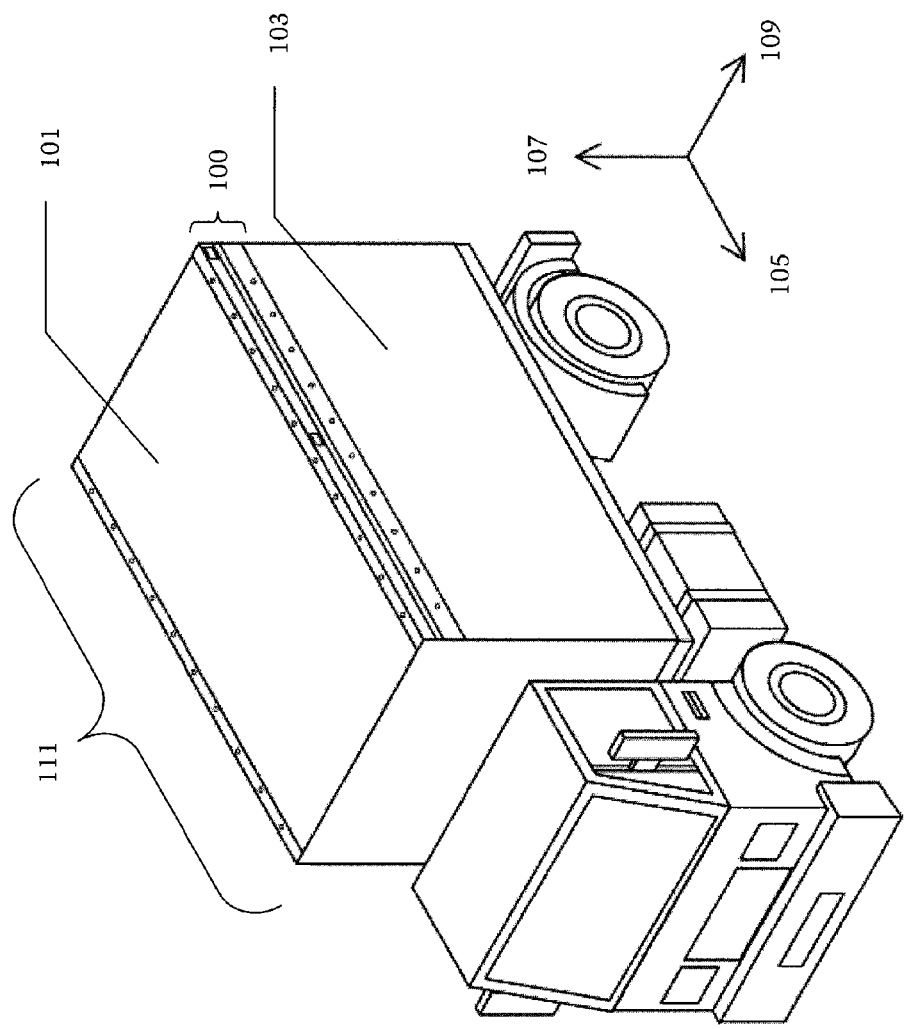
FIG. 1 depicts a perspective view of a truck having a conventional top rail.
Figure 1A:
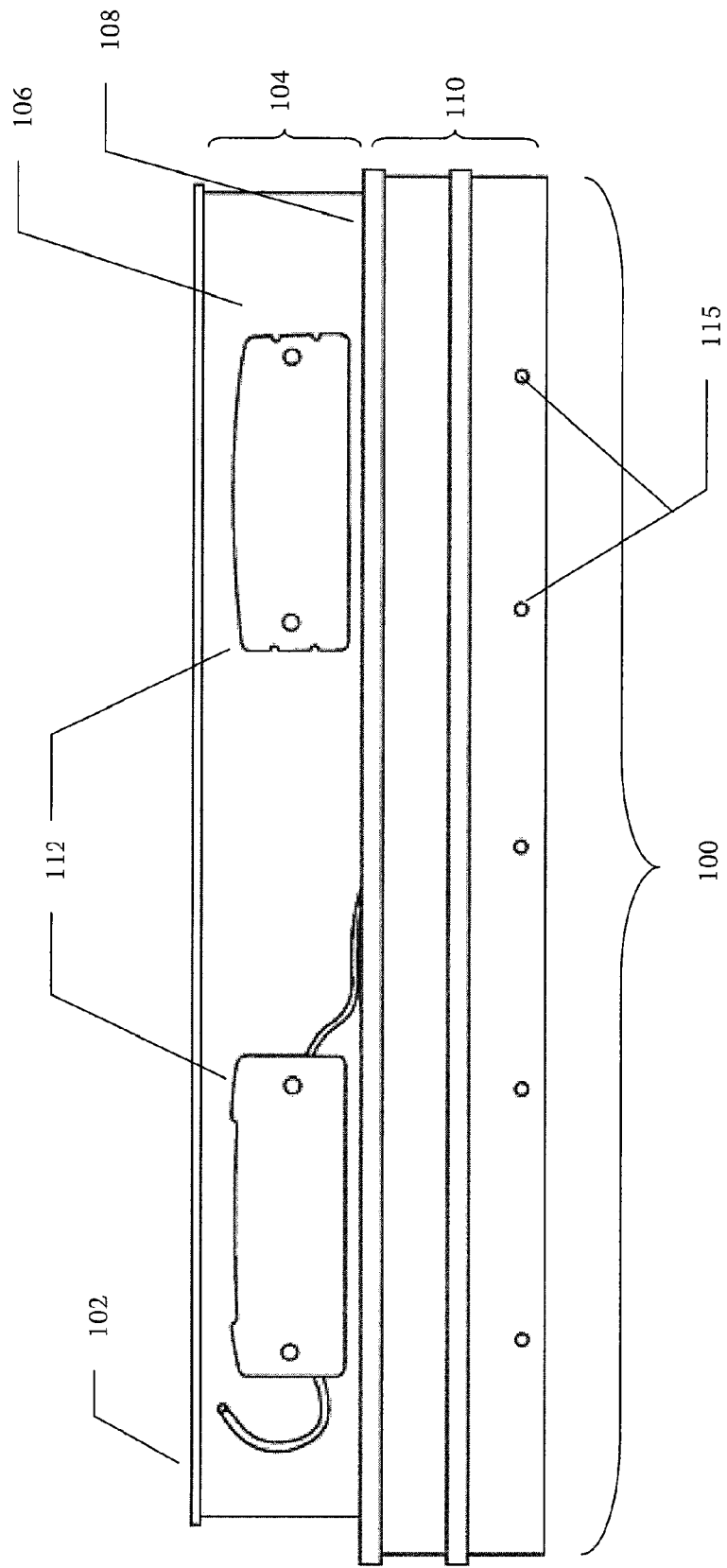
FIG. 1A depicts a side view of a conventional top rail assembly for a container body.
Figure 1B:
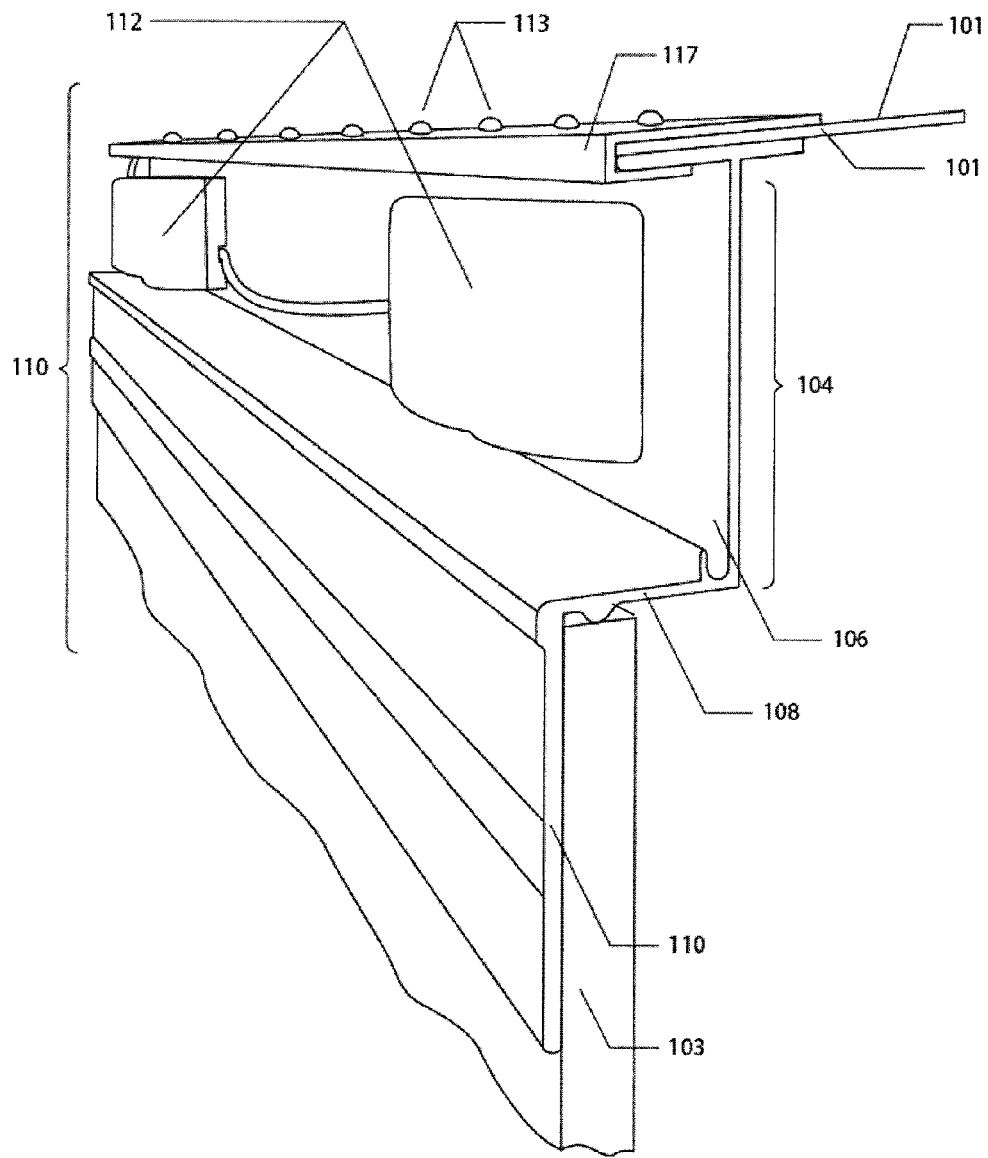
FIG. 1B depicts a front perspective view of the top rail assembly shown in FIG. 1A.
Figure 1C:
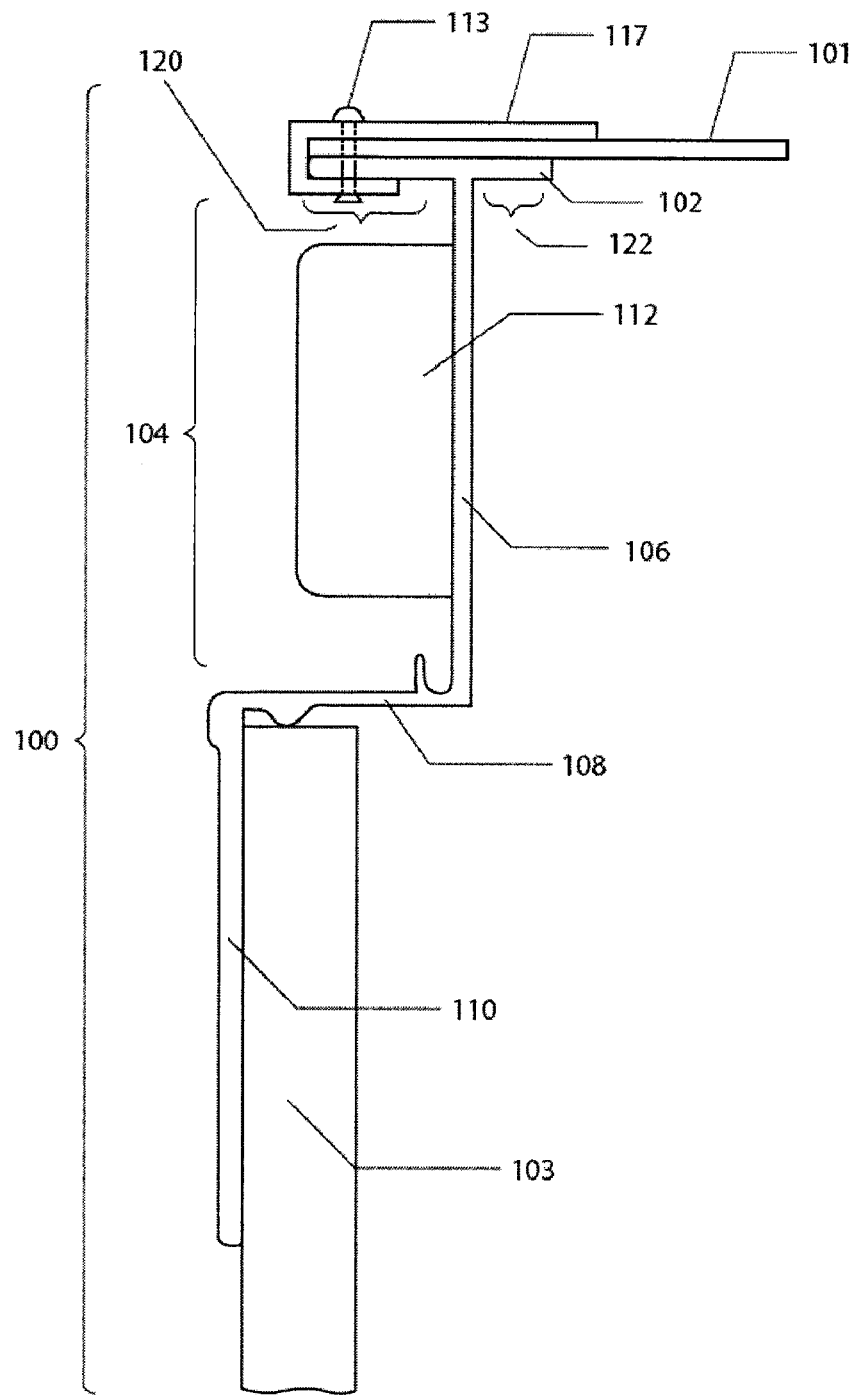
FIG. 1C depicts a cross-sectional view of the top rail assembly shown in FIGS. 1A and 1B.
Figure 1D:
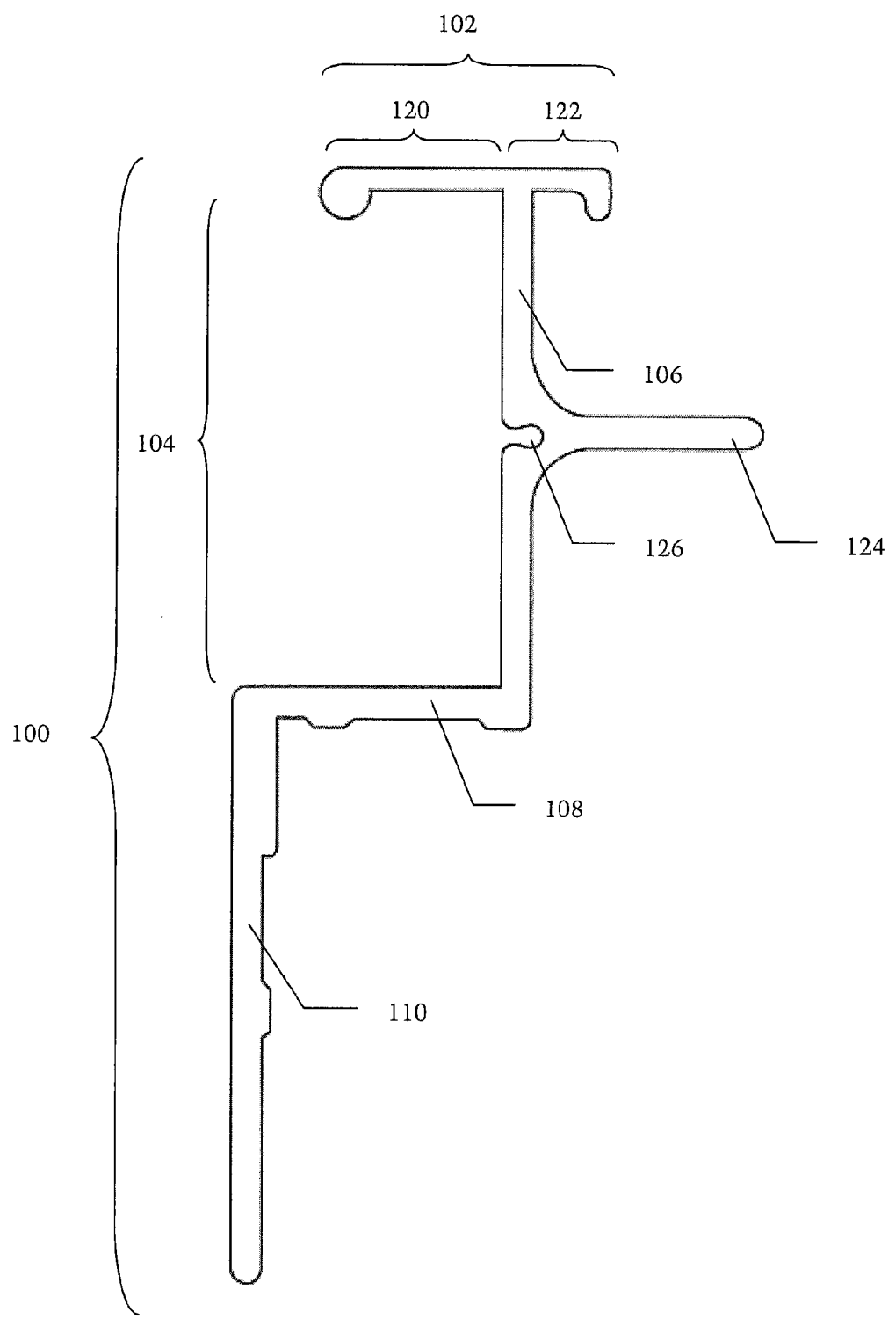
FIGS. 1D-1F depict various exemplary top rail designs.
Figure 1E:
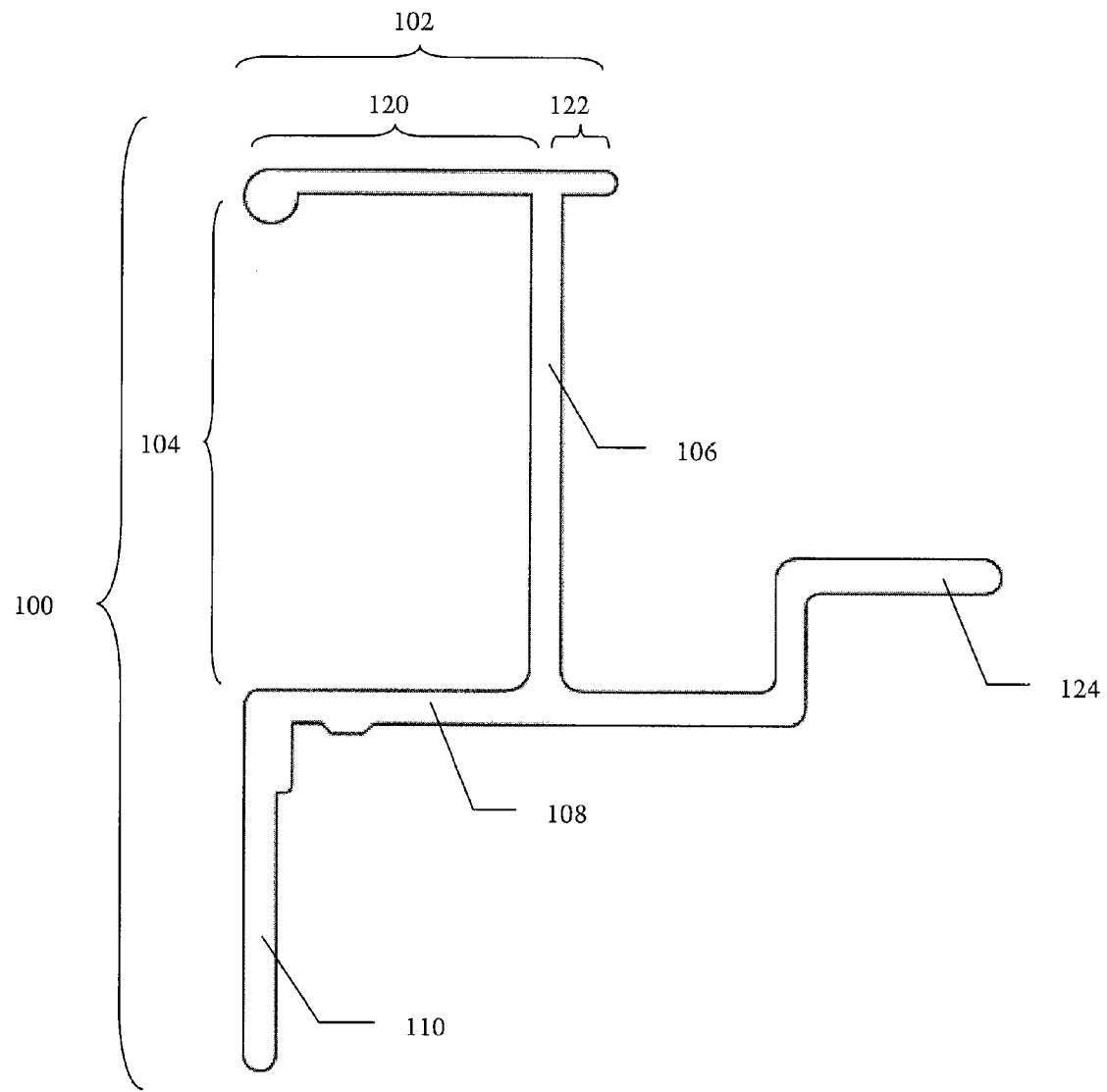
Figure 1F:
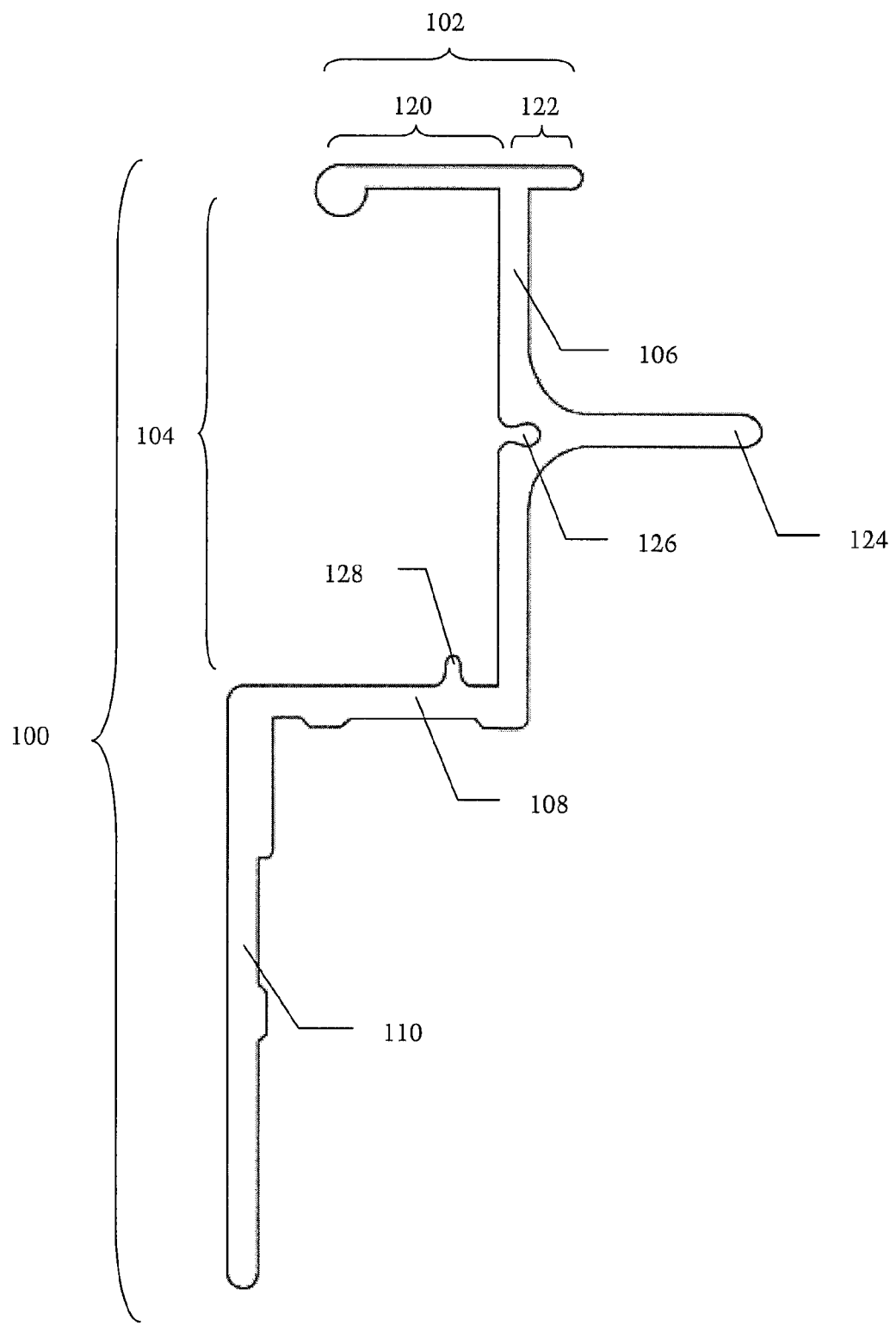
Figure 1G:
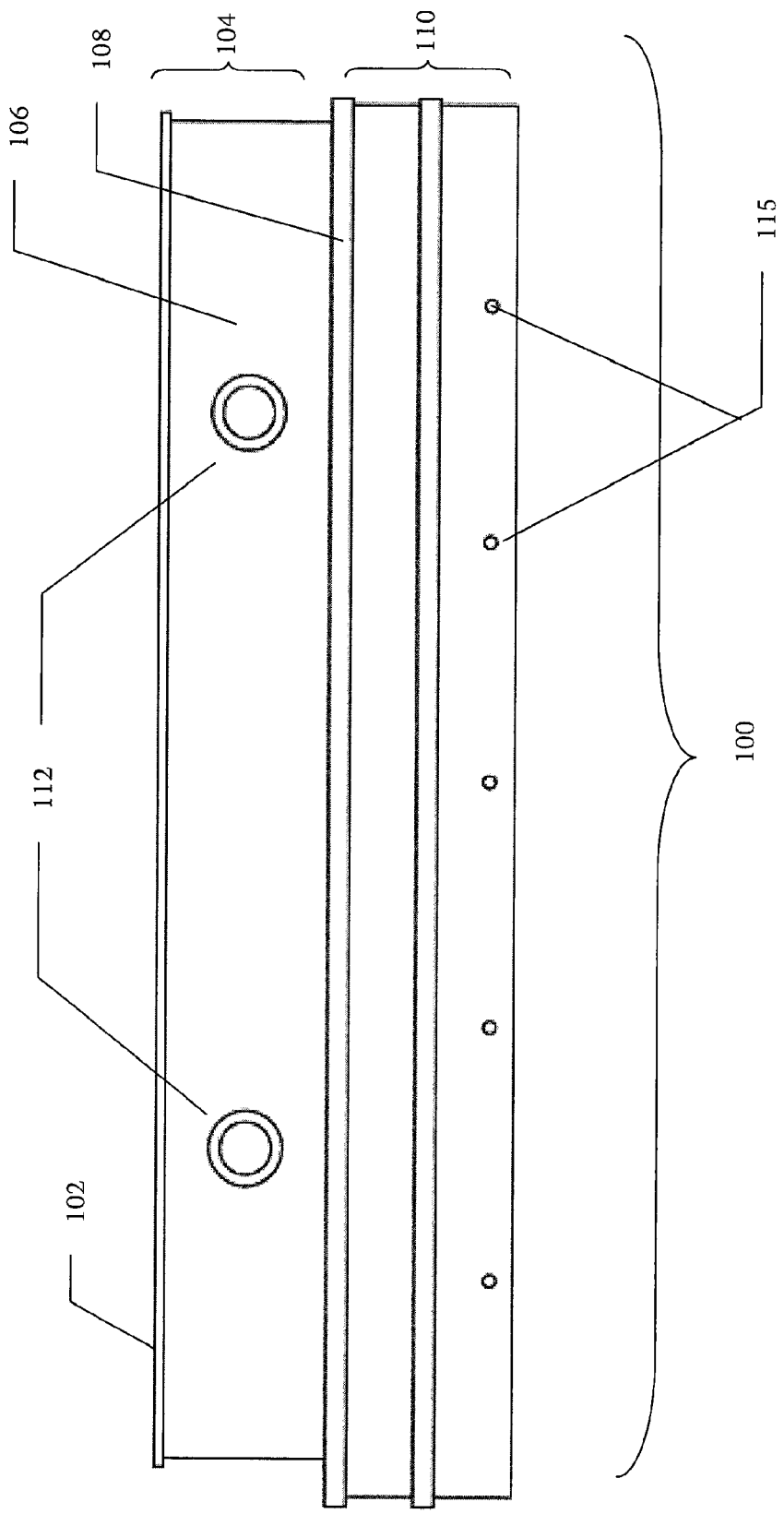
FIG. 1G depicts a prior art top rail assembly in which LEDs are installed in the channel.
Figure 1H:
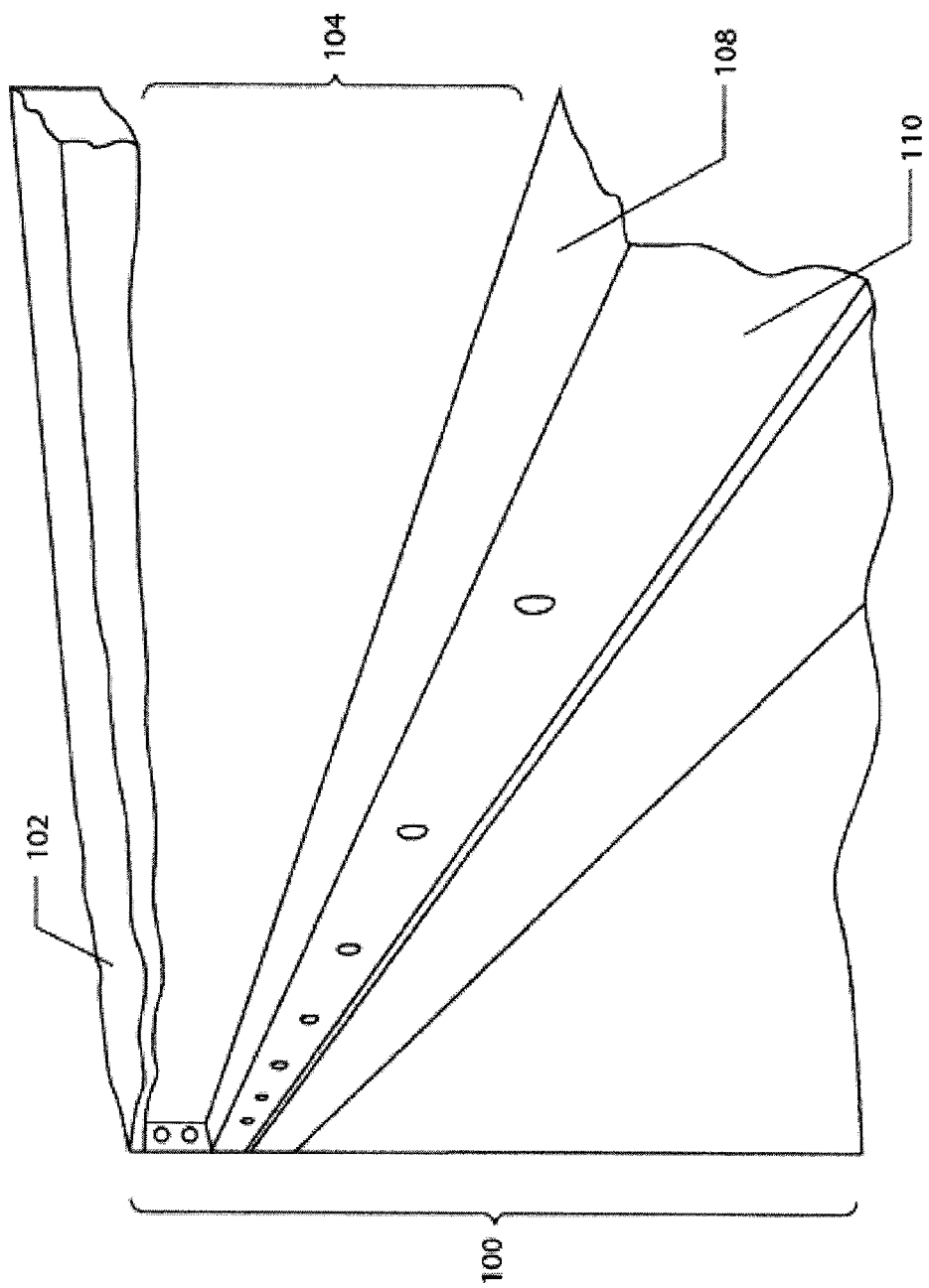
FIG. 1H depicts typical damage that may occur when an object strikes the conventional top rails shown in FIGS. 1A-1F.
Figure 2A:
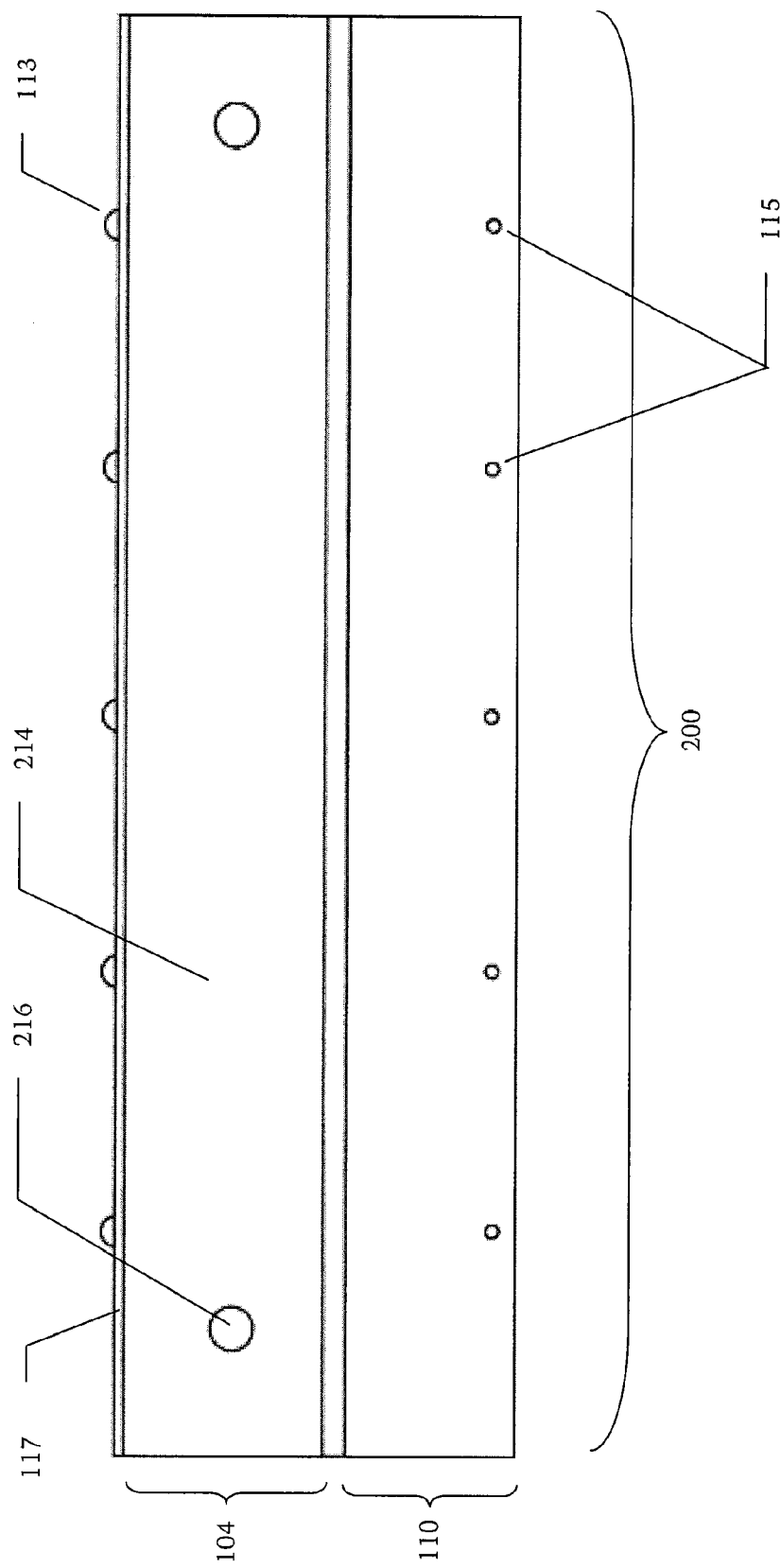
FIG. 2A depicts a side perspective view of an exemplary top rail according to an embodiment of the present invention.
Figure 2B:
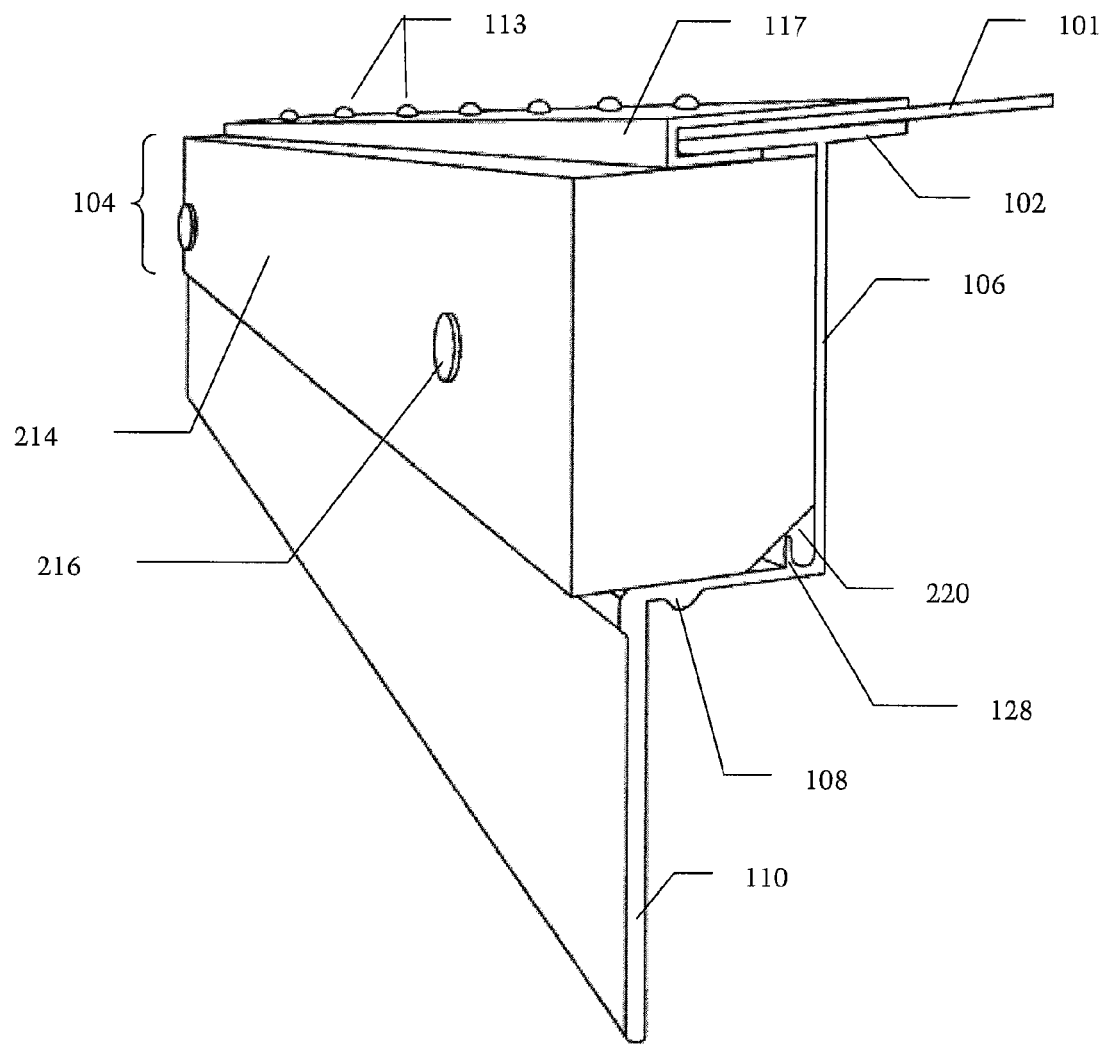
FIG. 2B depicts a front perspective view of the top rail shown in FIG. 2A.
Figure 2C:
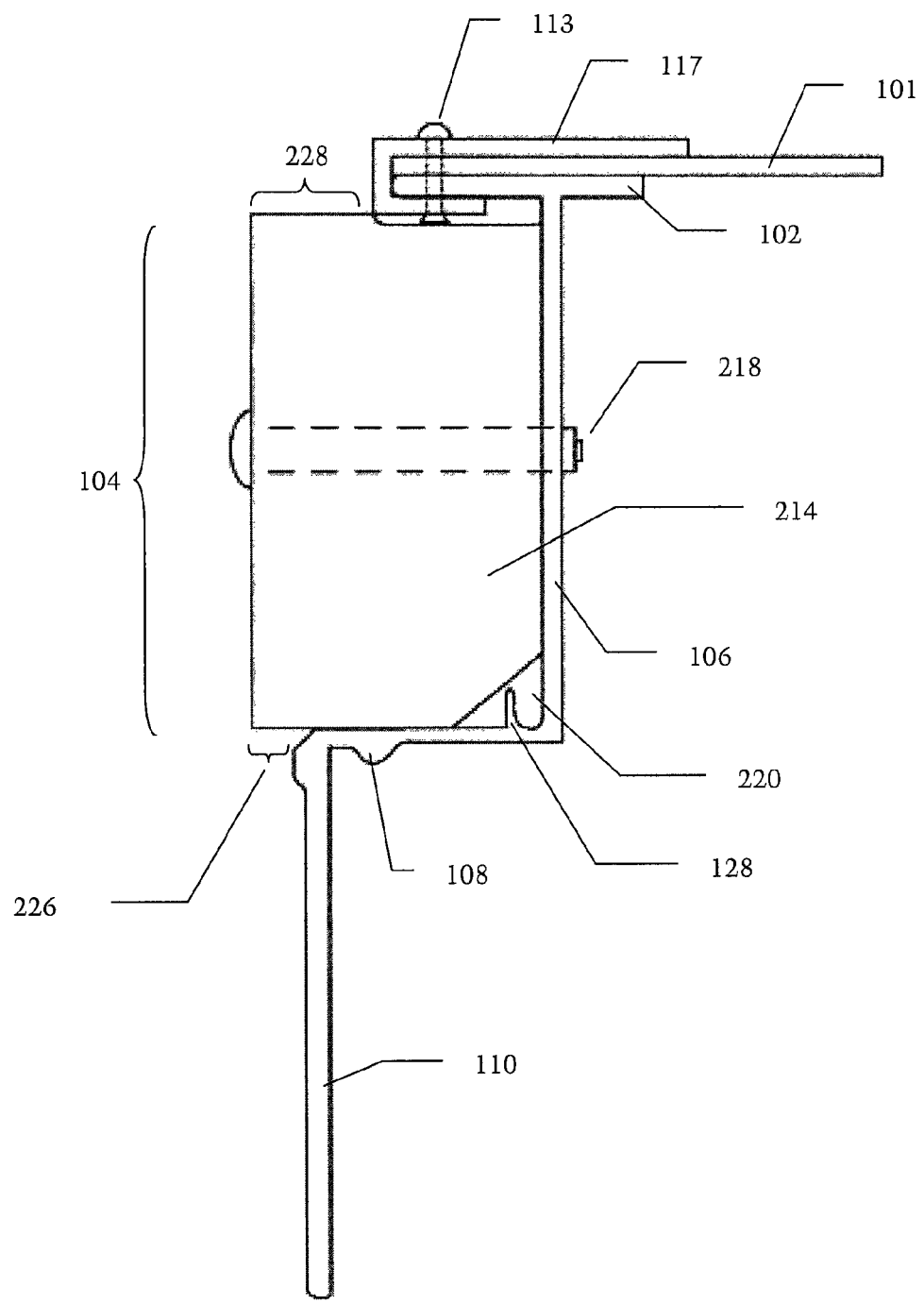
FIG. 2C depicts a cross-sectional view of the top rail shown in FIGS. 2A and 2B wherein a support block is secured in position within the channel.

FIGS. 2A-C show, respectively, a side view, a front perspective view and a cross-sectional view of an improved top rail 200 according to an exemplary embodiment of the present invention. In this embodiment, top rail 200 comprises a J-shaped piece 117, top lip 102, cavity channel 104, channel wall 106, bottom lip 108, and bottom wall 110 as described in connection with FIGS. 1A-F. To improve the resistance of top lip 102 to damage, a support structure is positioned within channel 104. In the example of FIGS. 2A-C, the support structure comprises a support block 214. The support block 214 is sized with dimensions to permit support block 214 to fit within channel 104. Preferably, the dimensions of support block 214 are such to produce a snug fit within channel 104 where the outer surfaces of the support block 214 engage against the boundaries of the channel 104 formed by the top lip 102, channel wall 106 and bottom lip 108. Support block 214 can be secured within channel 104 by fastening means, e.g. bolts 216.

While support block 214 in FIG. 2C is shown extending laterally outward from both the top lip 102 and the bottom lip 108, this need not be the case. Optionally, support block 214 may be configured to possess dimensions such that support block 214, when secured in place within channel 104, lines up with either or both of the outer edge of top lip 102 and bottom lip 108. Furthermore, support block 214 may be configured to possess dimensions such that either or both of the top lip 102 and bottom lip 108 extend beyond the block 214, when block 214 is secured in place within channel 104. While such alternative configurations are permitted, the inventors note their belief that by having support block 214 slightly extend outward from the top lip 102 and bottom lip 108 as shown in FIG. 2C, and indicated by numerals 226 and 228, greater protection from damage is provided by the support block to both the top lip 102 and bottom lip 108. An example of a preferred range for distance 228 by which the block 214 extends beyond the outer edge of the top lip 102 is ¼ inch to 1 inch. An example of a preferred range for distance 226 by which the block 214 extends beyond the outer edge of the bottom lip 108 is 0 to ½ inch.

Modification (e.g. shaping by grinding or cutting) of support block 214 may be required to ensure a snug fit, depending on the top rail shape. For example, FIGS. 2B and 2C show that support block 214 is shaped to exhibit a notch 220 to accommodate wiring flange 128 while still allowing support block 214 to fit snugly against the channel wall 106. FIG. 2B also shows that support block 214 exhibits a small notch at the top to accommodate the bottom portion of rivet 113. Alternatively, the rivet 113 may be installed after installation of the support block 214, such that the bottom portion of rivet 113 penetrates support block 214, thereby eliminating the need to create the notch.

Support block 214 may be formed of any solid material, and preferably is formed of a composite material, the composite material preferably comprising a combination of synthetic and natural materials. For example, 50% natural material (e.g., wood) and 50% synthetic material could be used. A preferred material for support block 214 has a strong compression strength and yield strength, and is water-resistant. For example, support block 214 preferably exhibits a compression strength in the vertical direction 107 in a range of approximately 1000 pounds per square inch (psi), and preferably around 3800 psi as measured under the standard ASTMD198. In an exemplary embodiment, the material for support block 214 may comprise the material used in EVERGRAIN® composite decking. EVERGRAIN® is a trademark of EPOCH Composite Products, Inc. 220 West Fourth Street, Joplin Mo., 64801. Specifications for EVERGRAIN® composite decking material are included as Appendix A. The support block material may alternatively comprise wood, metal, or any other solid material.

A variety of means can be used to secure support block 214 within channel 104. For example, as shown in FIGS. 2A-C, fasteners such as bolts 216 may extend through support block 214 and channel wall 106 and thus secure support block 214 within channel 104. A nut 218 can be secured at the end of each bolt 216 on the opposite side of the channel wall 106. It should also be understood that other means for securing support block 214 within channel 104 may be used including but not limited to rivets, adhesives, screws, or other means as is well known in the art. For example, FIG. 5C depicts an exemplary embodiment wherein support block 214 includes a bracket or prong 530 disposed within support block 214 such that an exposed surface of the bracket/prong 530 is substantially coplanar with the inward surface of support block 214 that engages the channel wall 106. The bracket/prong 530 can be formed from a metal material such as aluminum. A variety of techniques can be used to secure a support block 214 having bracket/prong 530 within the channel. For example, with a first preferred technique, the ends of the bracket/prong 530 can be frictionally fit within the block 214, and then screws (not shown) can be used along the length of the bracket/prong 530 for driving through the bracket/prong 530 into the block 214 to further secure the bracket/prong 530 to the block 214. To then secure the block 214 into the channel, a plurality of pop rivets (not shown) can be driven through the channel wall 106 into the bracket/prong 530. With a second alternative technique, to secure the block 214 within the channel, a resin or other adhesive material can be used to affix the bracket/prong 530 to the channel wall 106. By using a metal-to-metal contact point for securing support block 214 within the channel via a resin or other adhesive, the inventors believe that the block will be more securely fastened within the channel than with a resin or adhesive that affixes the block's composite material directly to the metal of the channel wall 106. However, the inventors note that a suitable resin or adhesive could be used to directly affix the block's composite material to the channel wall if desired, thus alleviating the need for bracket/prong 530. Some exemplary adhesives for bonding a polyurethane block to an aluminum top rail include "LOCTITE® 5590 Adhesive Sealant", "LOCTITE® U-05FL Hysol Urethane Adhesive, High Strength", and "LOCTITE® 3034 Polyolefin Bonder". LOCTITE® is a registered trademark of Henkel Corporation, 1001 Trout Brook Crossing Rocky Hill, Conn., 06067. Additional information is available at http://www.loctite.com.

Figure 3A:
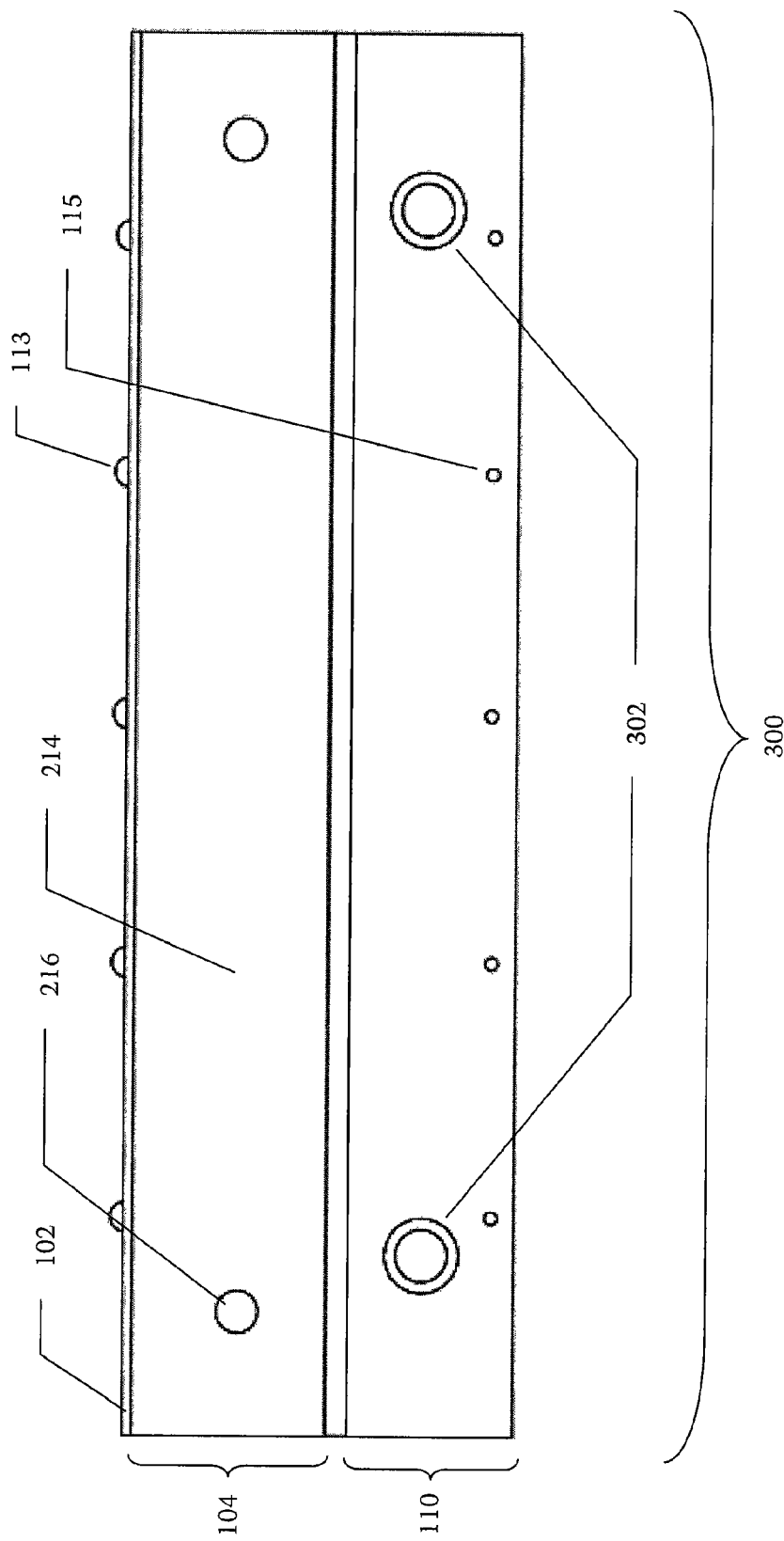
FIG. 3A depicts a side perspective view of an exemplary embodiment including a low profile light source mounted to a bottom portion of the top rail.

FIG. 3A depicts a side view of a top rail 300 which, relative to the top rail 200 of FIGS. 2A-2C, also includes a plurality of low profile light sources 302 affixed to the top rail's bottom wall 110. While two low profile light sources 302 are depicted in FIG. 3A, it should be understood that more, or fewer light sources could be used. For example, applicable laws/regulations may only require one light at the rear of the top rail for trucks less than 30 feet in length while requiring two lights for trucks over 30 feet.

Figure 3B:
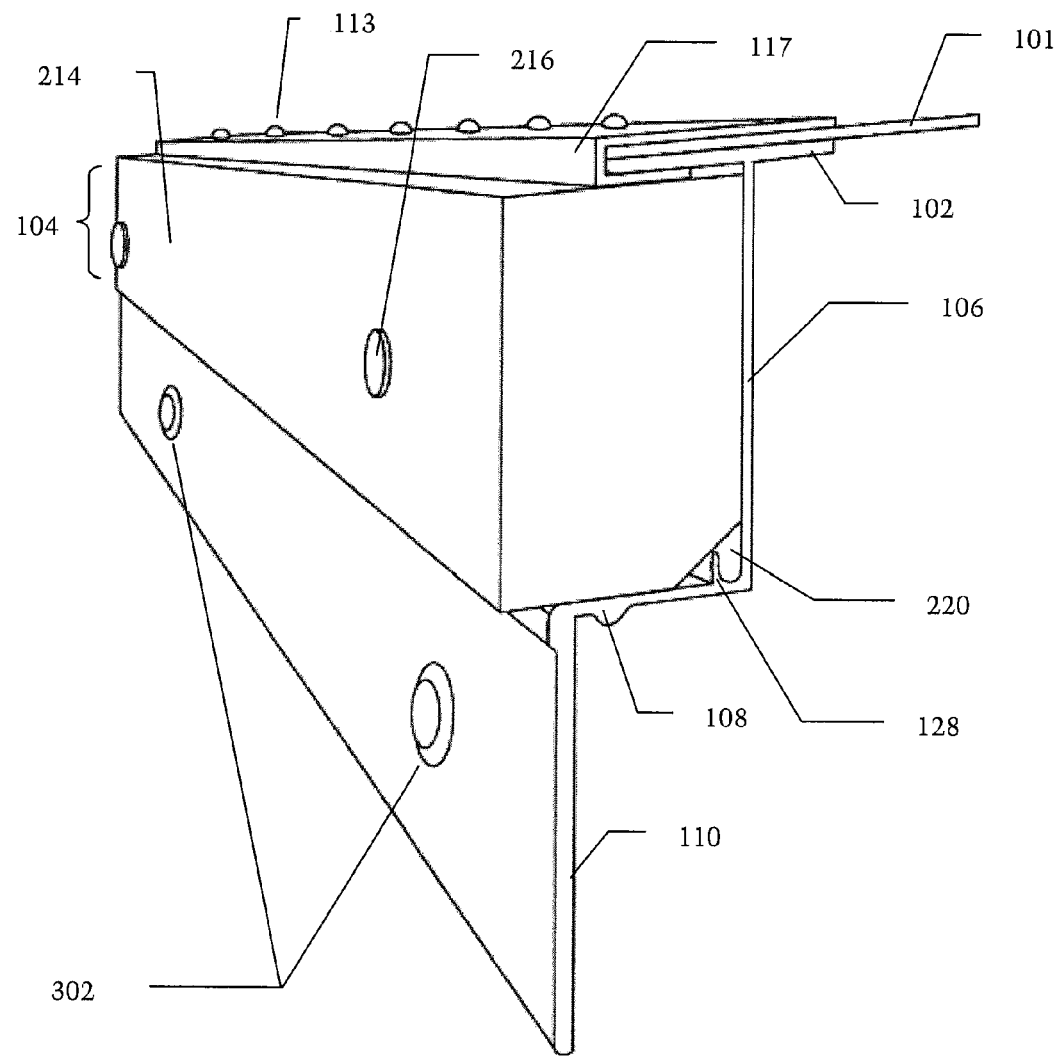
FIG. 3B depicts a front perspective view of the top rail shown in FIG. 3A.
Figure 3C:
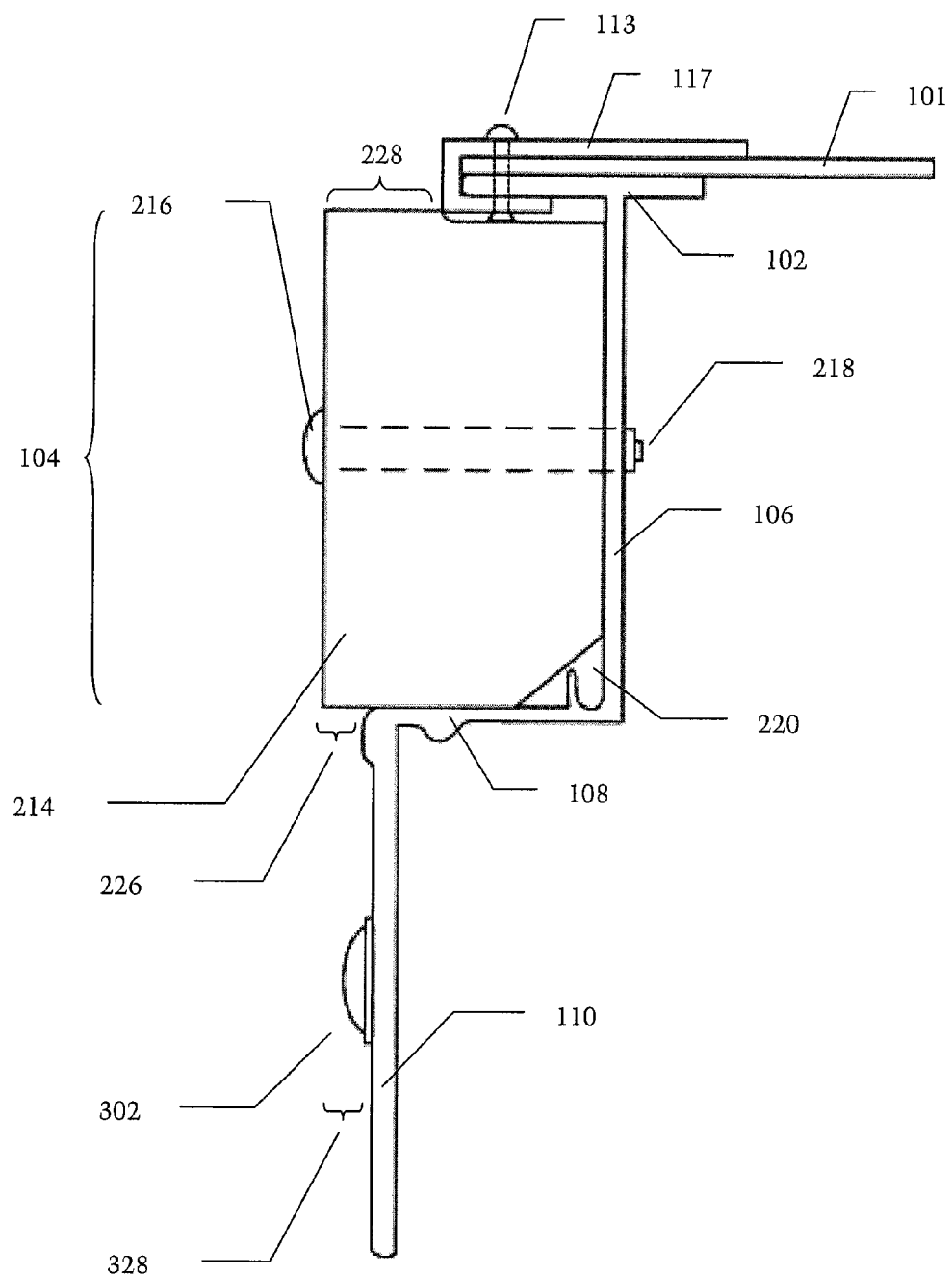
FIG. 3C depicts a cross-sectional view of the top rail shown in FIGS. 3A and 3B.

In a preferred embodiment, the low profile light source comprises a plurality of light emitting diode (LED) units 302 spaced along the length of the top rail's bottom wall 110 as shown in FIG. 3A. Each LED unit 302 preferably comprises an LED and a surrounding grommet that forms a water-tight seal around the LED (as shown in greater detail in FIGS. 9A-9B). FIG. 3B shows a front perspective view of this top rail 300. Relative to the light source 112 of a conventional top rail 100 as shown in FIGS. 1A-1C, the light source 302 of FIG. 3A exhibits a low profile with reference to how far it extends laterally outward from the container body sidewall (or top rail bottom wall 110). Preferably, this lateral extension is no greater than ¼ inches from the bottom wall 110. FIG. 3C shows a cross-sectional view of this top rail 300, including low-profile light 302 and further indicating the lateral extension 328 for the light 302. A preferred configuration for the LED units 302 is a circular shape with a diameter of approximately ¾ inches and a maximum height of approximately ¼ inches as mentioned above. However, it should be understood that other shapes and dimensions could be used. Each LED unit 302 also preferably includes a collar (grommet) formed of a soft material such as a rubber material to provide a cushion that protects the LED against impacts. A preferred LED unit 302 that can be used in connection with the embodiment of FIGS. 3A-C is a TRUCK-LITE® 33 Series marker and clearance grommet kit LED. TRUCK-LITE® is a registered trademark of Truck-Lite Co., Inc., 310 East Elmwood Ave, Falconer, N.Y., 14733.

To secure the LED units 302 to the bottom wall 110, the lights are mounted into ¾ inch holes in wall 110. Wiring may be run to the light inside the truck body.

Because the light source 302 will not extend very far in the lateral direction away from the container body sidewall, the inventors believe that this reduced profile of the light source will improve its resistance to (and avoidance of) impacts that would tend to cause shearing damage to light sources with a larger profile. Also, in an embodiment wherein the low profile light source 302 is combined with a support block 214 as shown in FIG. 3A, the inventors note that the top rail 300 will retain its illumination while still benefitting from the increased strength provided by the support block within the channel. Furthermore, in an embodiment wherein support block 214 extends beyond the bottom lip 108 as shown in the cross-sectional view of FIG. 3C, the inventors further believe that this lateral extension 226 will further contribute to protecting the low profile light source 302 from damage because the support block 214 may deflect some objects from striking the light source 302.

Figure 9A:
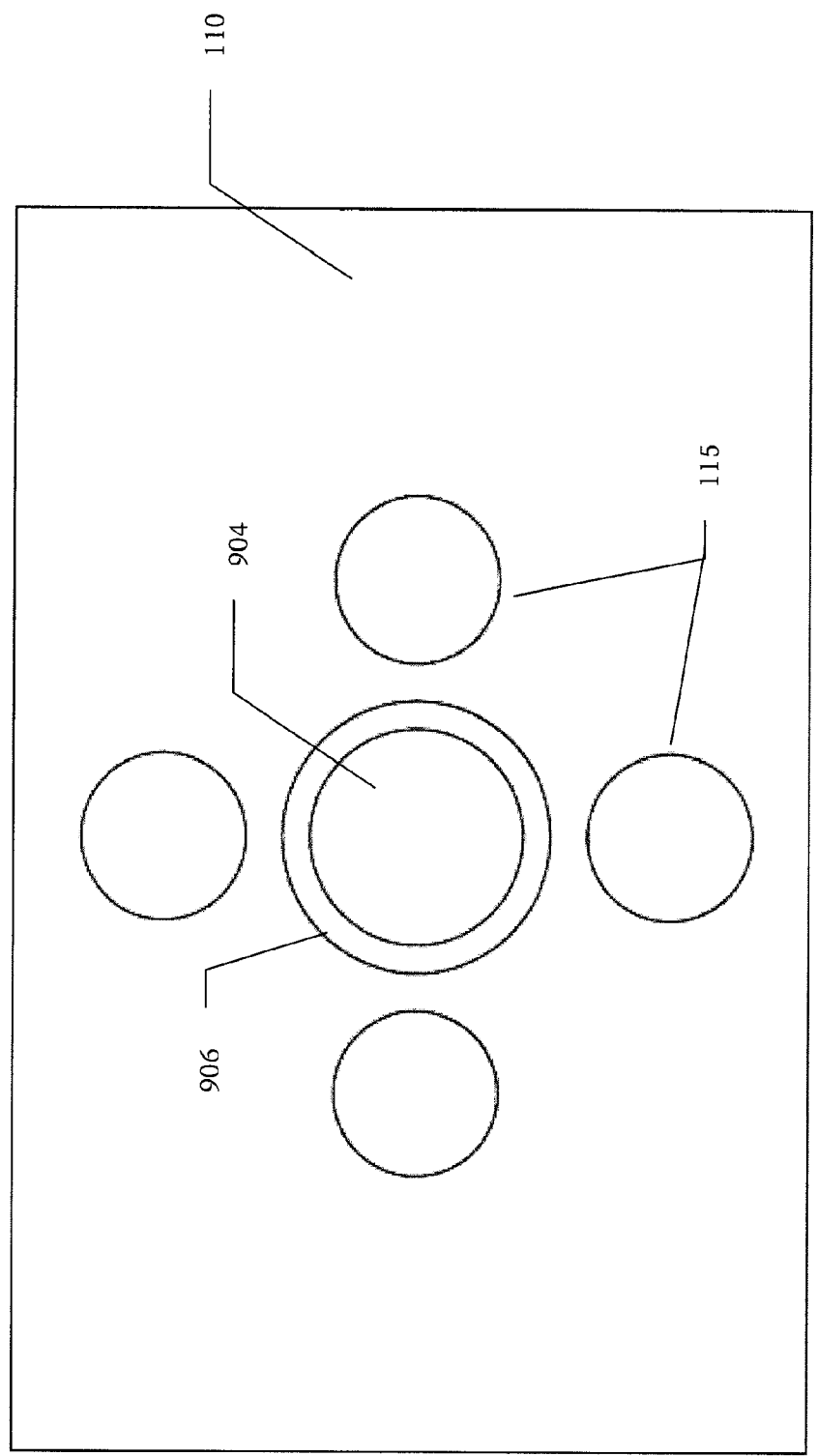
FIGS. 9A-9D depict exemplary embodiments wherein a low-profile LED is situated near a plurality of rivets.
Figure 9B:
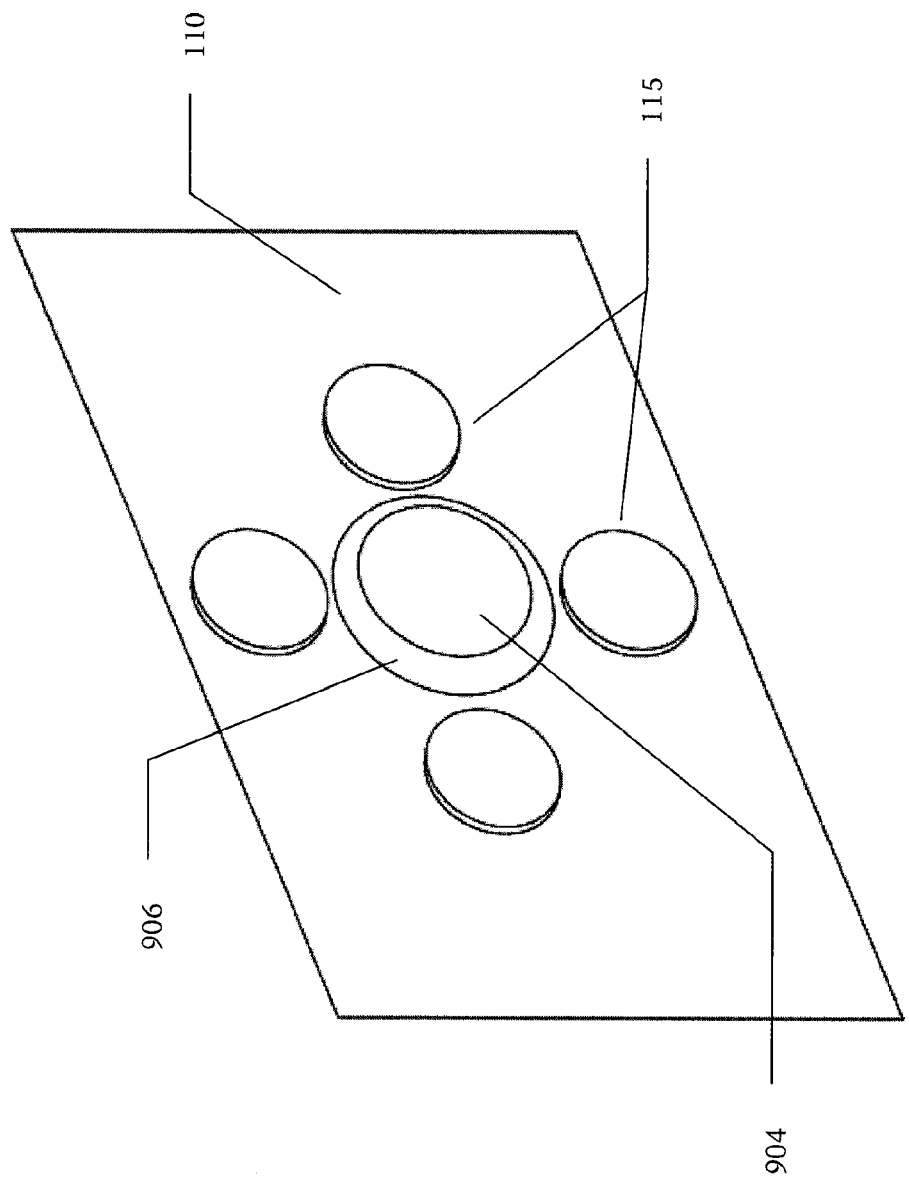
Figure 9C:
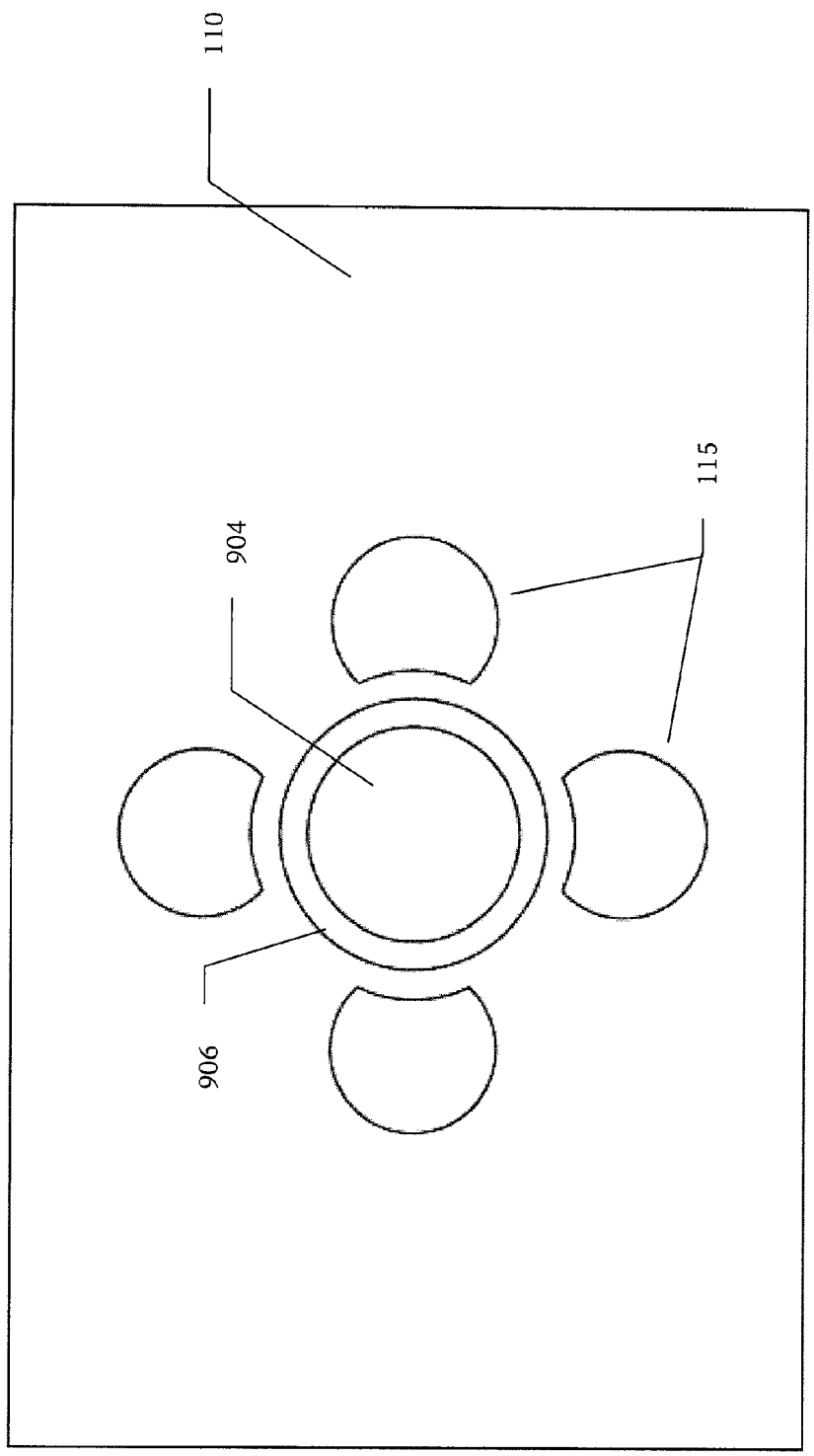
Figure 9D:
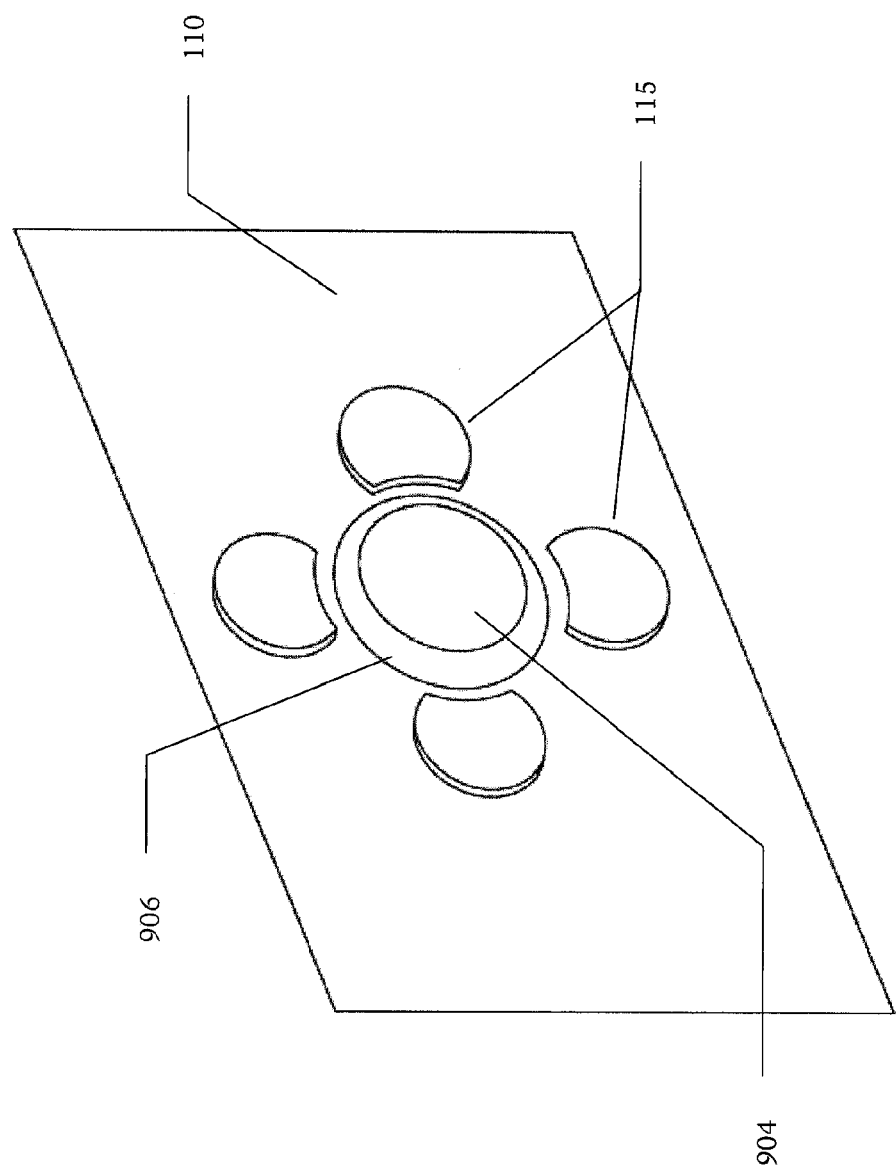

FIGS. 9A-9D depict two exemplary embodiments wherein a low-profile light 302 affixed to a surface such as the bottom wall 110 of a top rail is protected from shearing and strikes by its close proximity to fasteners such as rivets 115. Each light assembly 302 comprises a LED 904 and a surrounding grommet 906. In FIG. 9A the rivets are arranged above, below, and on both sides of LED 302. Thus, a tree branch that would otherwise strike the grommet 906 will likely first strike the head of rivet 115 and be lifted away from the surface of the top rail. As such, the light source 302 will either miss the impact from the tree branch entirely or will receive only a glancing blow with the brunt of the impact force being exerted on the rivets. Thus, with this arrangement it is less likely that a tree branch (or other object) strike in the area will strike the grommet and damage or dislodge the grommet and/or LED. In the embodiment of FIG. 9A, a preferred proximity of rivets to the light source is approximately 1/16 inch or less. In an exemplary embodiment, the rivet head can be in contact with grommet 906. In FIGS. 9C and 9D, the arrangement is similar, but the rivet heads have a crescent shape as shown to allow closer proximity of the rivets to the grommet 306 of light assembly 302. The crescent shape can be achieved in a number of ways, as will be apparent. For example, by cutting a half or quarter moon shape out of the rivet heads, the rivets can further envelop the light source 302 to provide what the inventors believe will be improved protection from tree branch strikes. It should be understood that various fasteners (e.g. rivets, bolts, screws) can be installed as described above to provide protection to a low-profile light source. It should further be understood that such techniques may be used to protect a light source in various locations. For example, in an embodiment wherein a low-profile light source is disposed on the support structure, a fastener such as bolt 216 may be placed such that the head of bolt 216 is adjacent to the light source.

Figure 4A:
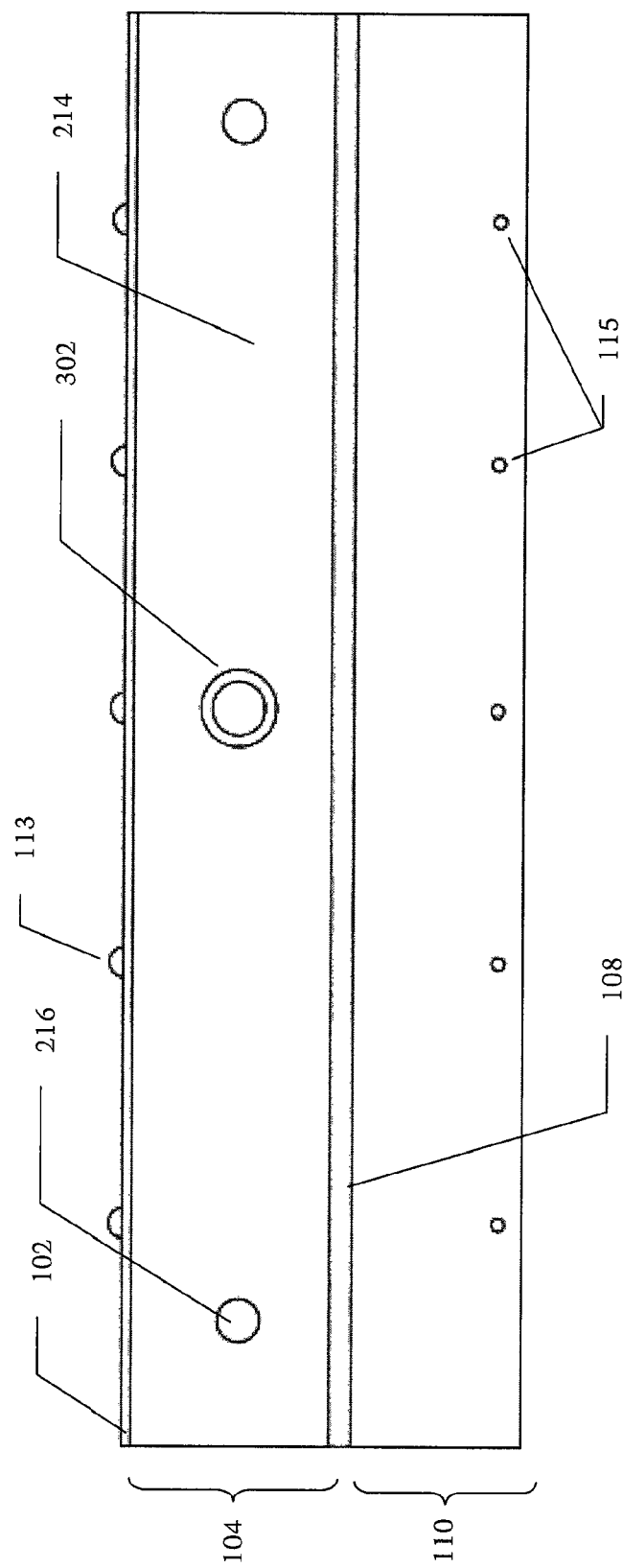
FIG. 4A-C depict front perspective and cross-sectional views, respectively of various embodiments of a top rail having a low-profile light-source installed in a support block in the channel.
Figure 4B:
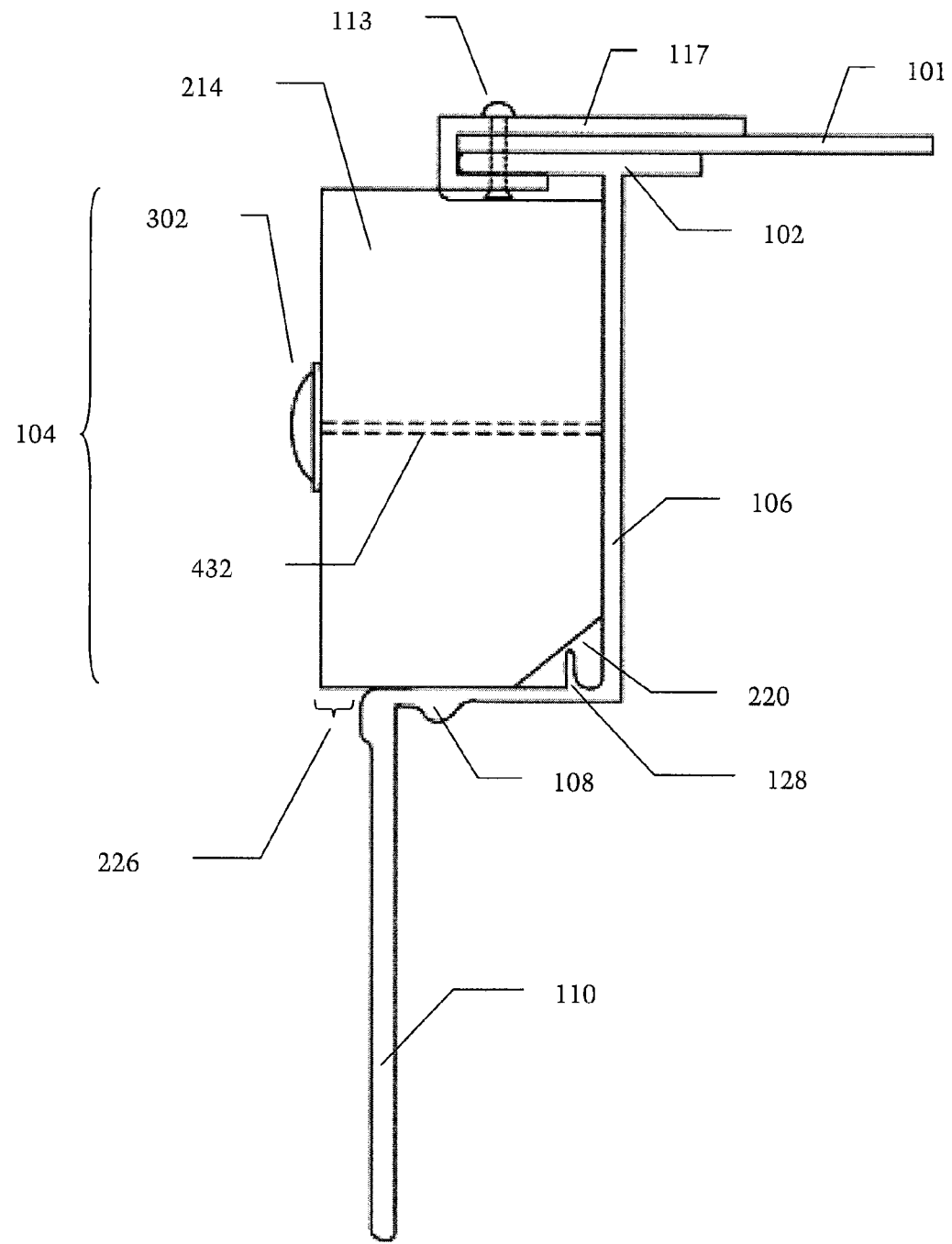
Figure 4C:
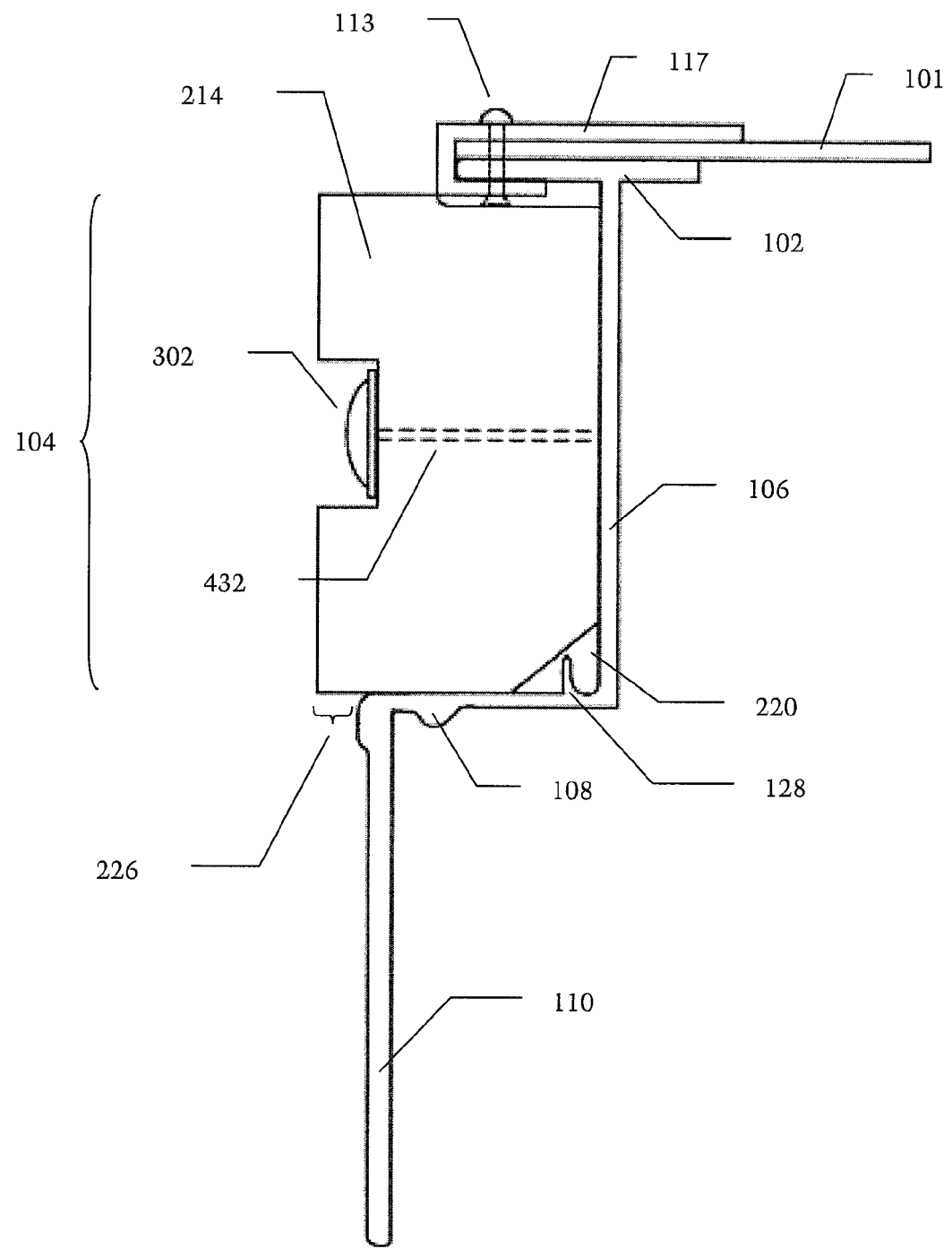

Further still, in alternate embodiments, the low profile light source 302 can be affixed in places other than the bottom wall 110. In the exemplary embodiment of FIGS. 4A-C and 5D the low profile light source is mounted on the block 214. In such an embodiment, block 214/514 comprises a cylindrical hole 432/532 to allow for installation of the light 302. The hole may be drilled or formed during manufacture of the block 214/514. In such embodiments, the wiring hole 432/532 would preferably be sealed, e.g. by applying caulk. As shown in FIG. 5D, the cylindrical hole 532 for wiring may allow the wires to travel to wire guide 126 of the top rail. It will be understood that the location of wiring guide 126 may vary between top rail designs, and that the wiring hole would be adjusted accordingly. As shown in FIG. 4C, the low-profile light source 302 may be installed in a recess within the block 214/514 for added protection. The recess may be shaped such that light source 302 protrudes from the recess in order to provide better visibility, while still receiving some protection.

Figure 5A:
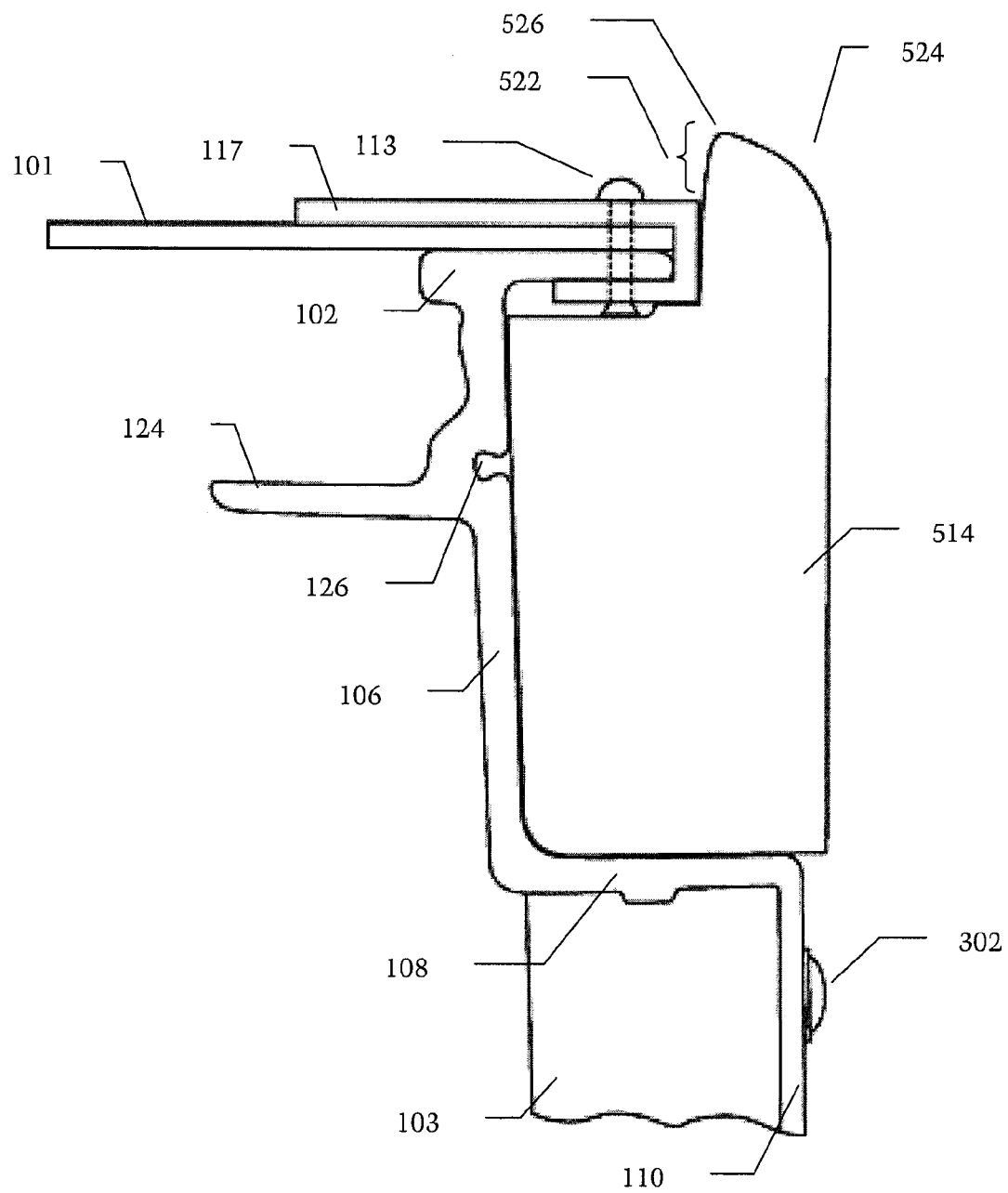
FIGS. 5A-5D depict cross-sectional views of exemplary top rail embodiments comprising exemplary support blocks.
Figure 5B:
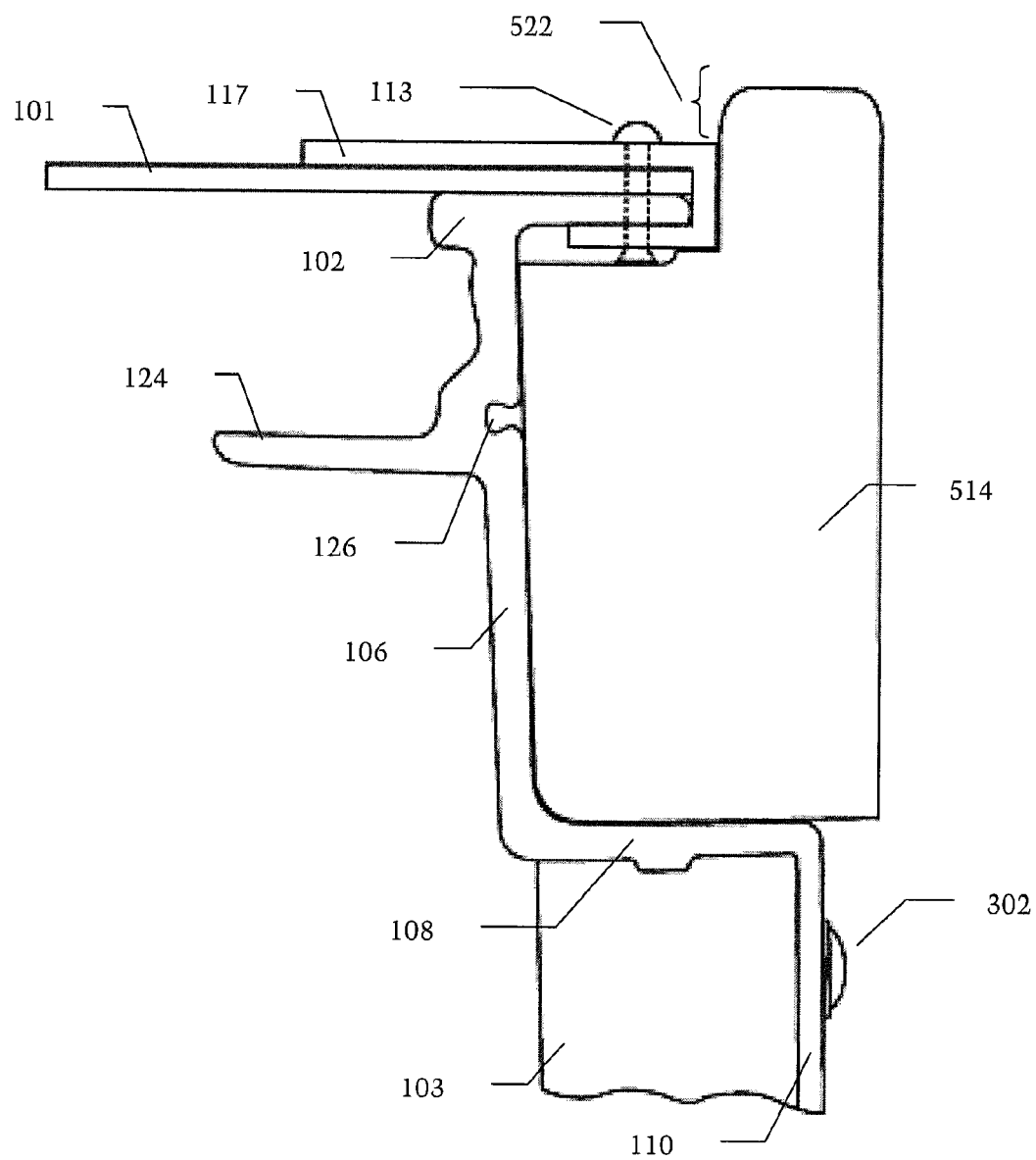
Figure 5C:
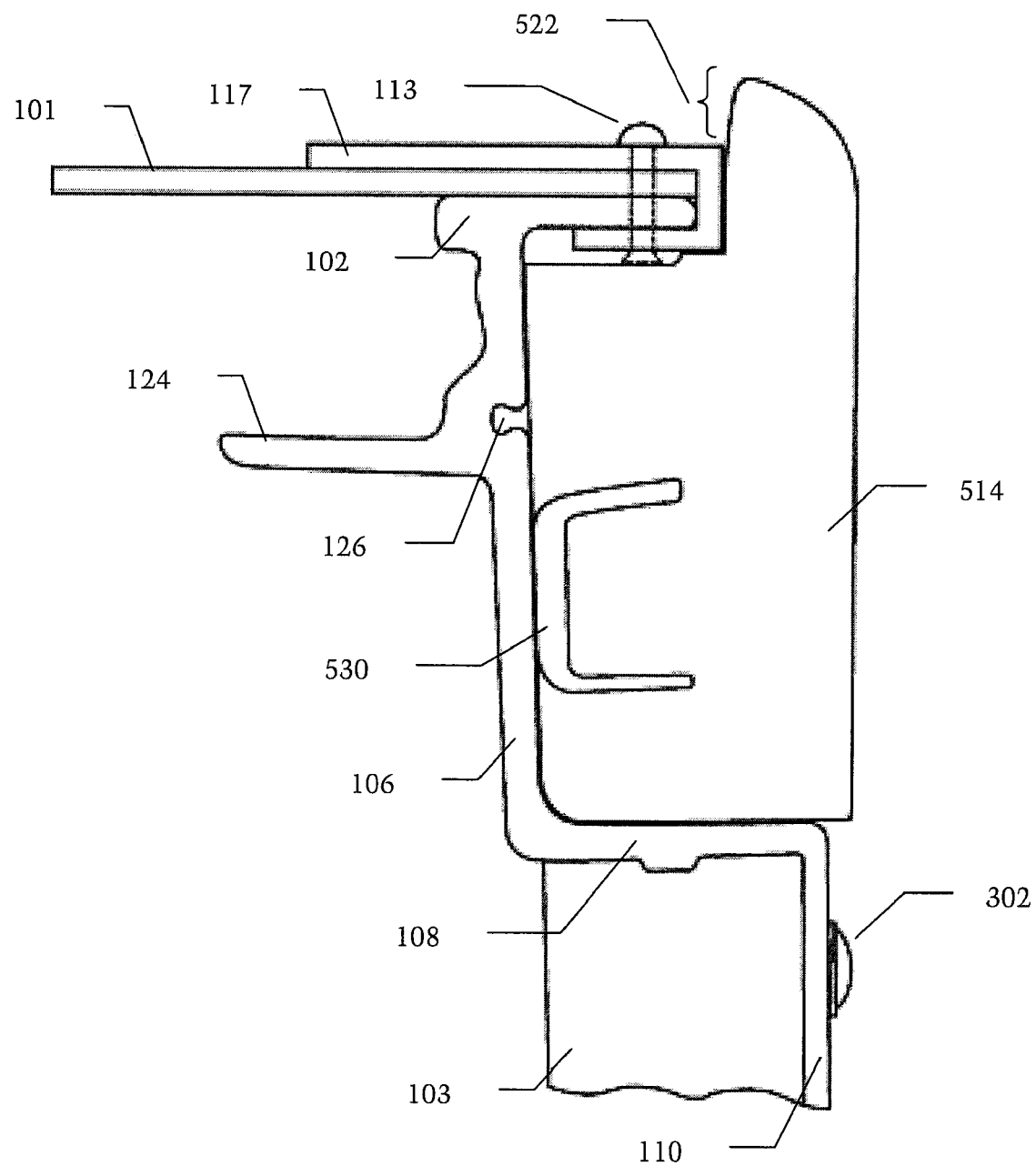
Figure 5D:
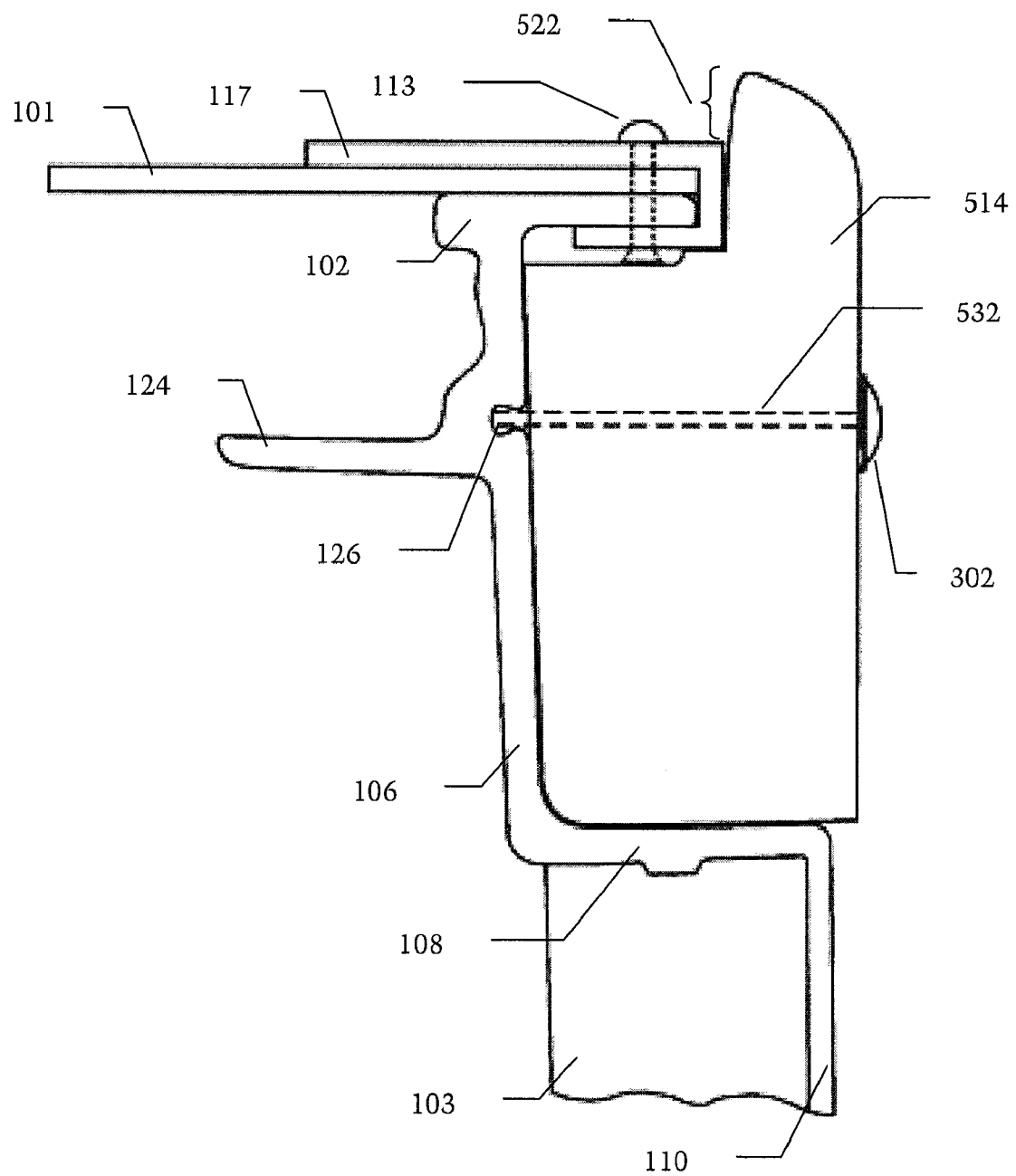

FIG. 5A shows a cross-sectional view of another exemplary embodiment of a top rail 500. In this embodiment, solid block 514 includes a portion 522 that extends above the top lip 102 and "J"-shaped piece 117 when block 514 is secured within channel 104. Block 514 is preferably similar to block 214, but also includes the extended portion 522, which provides additional protection for the "J"-shaped piece 117, container roof 101 and top lip 102 against strikes from above. Optionally, this portion 522 may be contoured as shown in FIG. 5A, such that the outward surface 524 of portion 522 curves in a convex manner. Also, the inward surface 526 of portion 522 may optionally be contoured in a concave or convex manner. However, this need not be the case, as solid block 514 can also be configured such that portion 522 exhibits a more box-like shape, as shown in FIG. 5B. As shown in FIG. 5B, portion 522 exhibits a box-like shape with optional rounded edges.

Preferably, portion 522 extends vertically above rivets 113. Examples of a suitable height for portion 522 is approximately ⅛ inch to ¼ inch higher than the top of rivets 113, with a preferred value of ¼ inch. Also, it is preferred that portion 522 be integral with and formed of the same material as the rest of block 514. In an exemplary embodiment, caulk (or other sealant) is applied to block 514 prior to or after installation so that once the block 514 is installed with a snug fit against the "J"-shaped piece 117, a water-tight barrier is formed. However, in an embodiment wherein the block is bonded into the rail and/or the bolt holes for bolts 216 are sealed, caulk will not be necessary. Eliminating the need for caulk is advantageous because caulk will eventually degrade and require replacement.

Figure 6A:
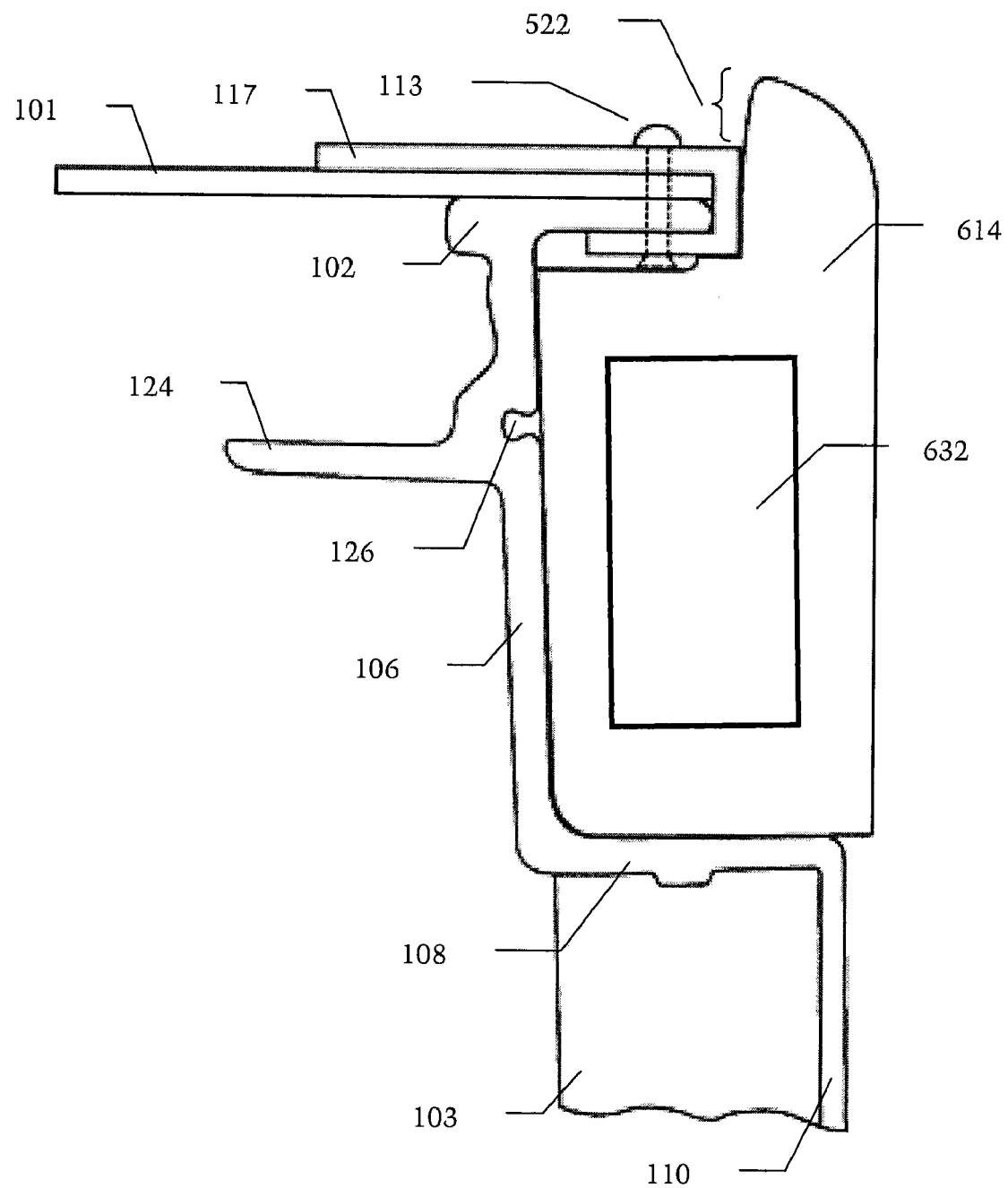
FIGS. 6A-6F depict cross-sectional views of exemplary top rail embodiments comprising additional exemplary support blocks.
Figure 6B:
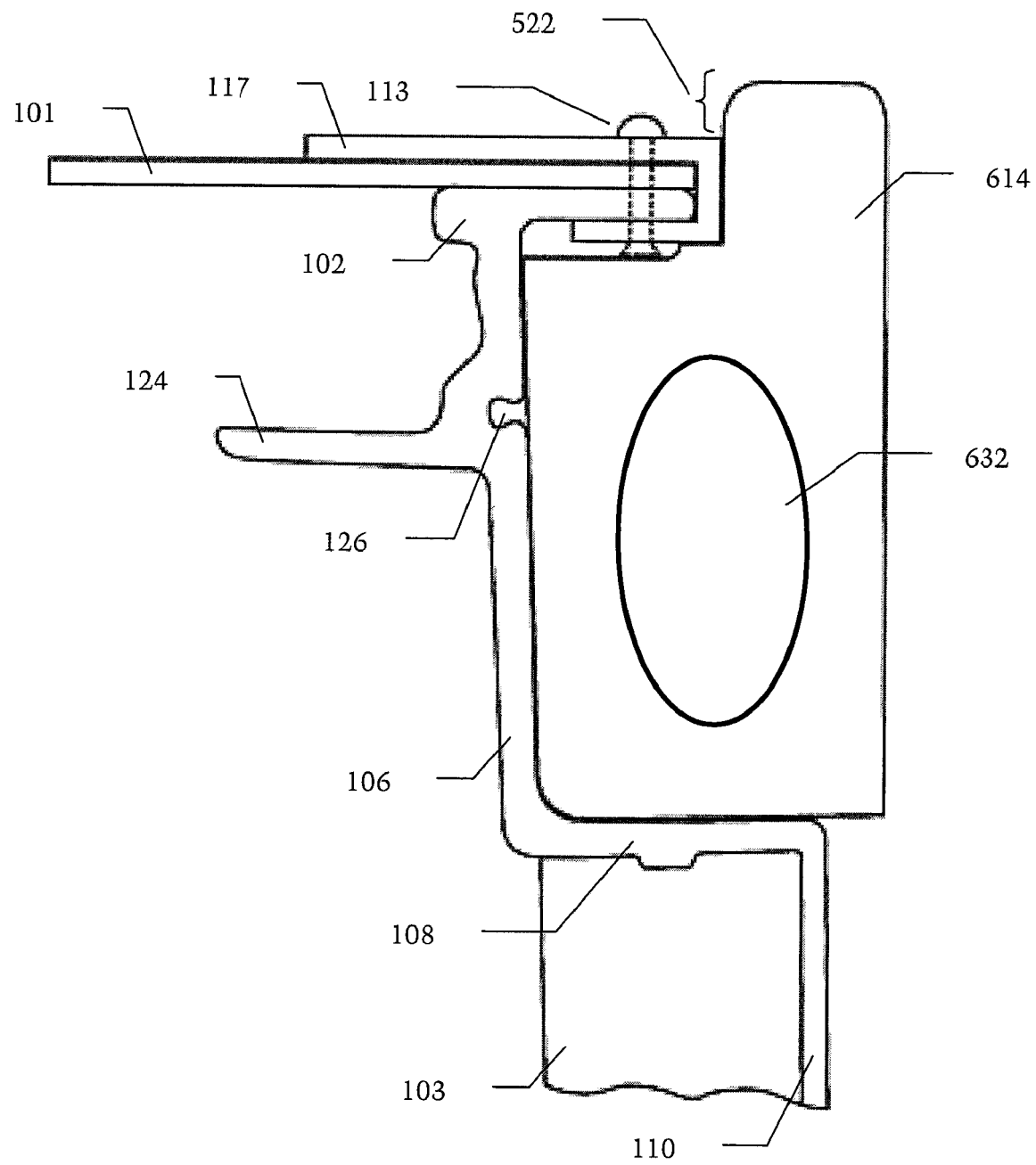
Figure 6C:
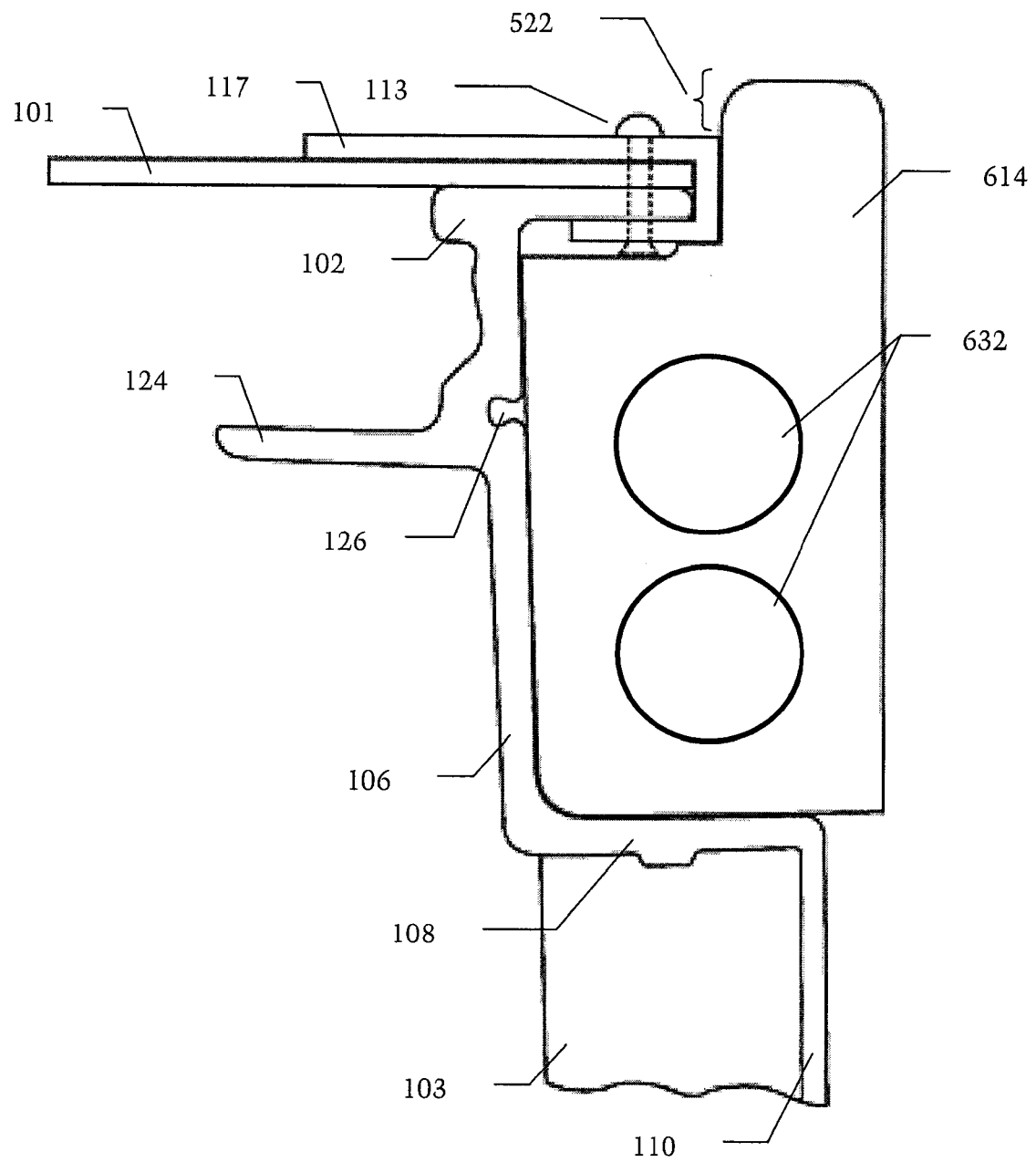

In additional exemplary embodiments, the inventors note that the support block may include hollow portions 632, as shown in FIGS. 6A-C. The shape and configuration of these hollow portions may be varied. In FIG. 6A, hollow section 632 has a rectangular cross-sectional shape. In FIG. 6B, hollow section 632 has a oval cross-sectional shape, and FIG. 6C depicts a plurality of smaller roughly circular cross-sectional hollow shapes. While the inventors note that such hollowed-out portions can provide the block 214 (and thus the truck) with a lighter weight (thus improving the truck's fuel economy), the inventors further note that the hollowed-out sections should not be made too large to sacrifice the compression strength and damage-resilience of the block 214.

Figure 6D:
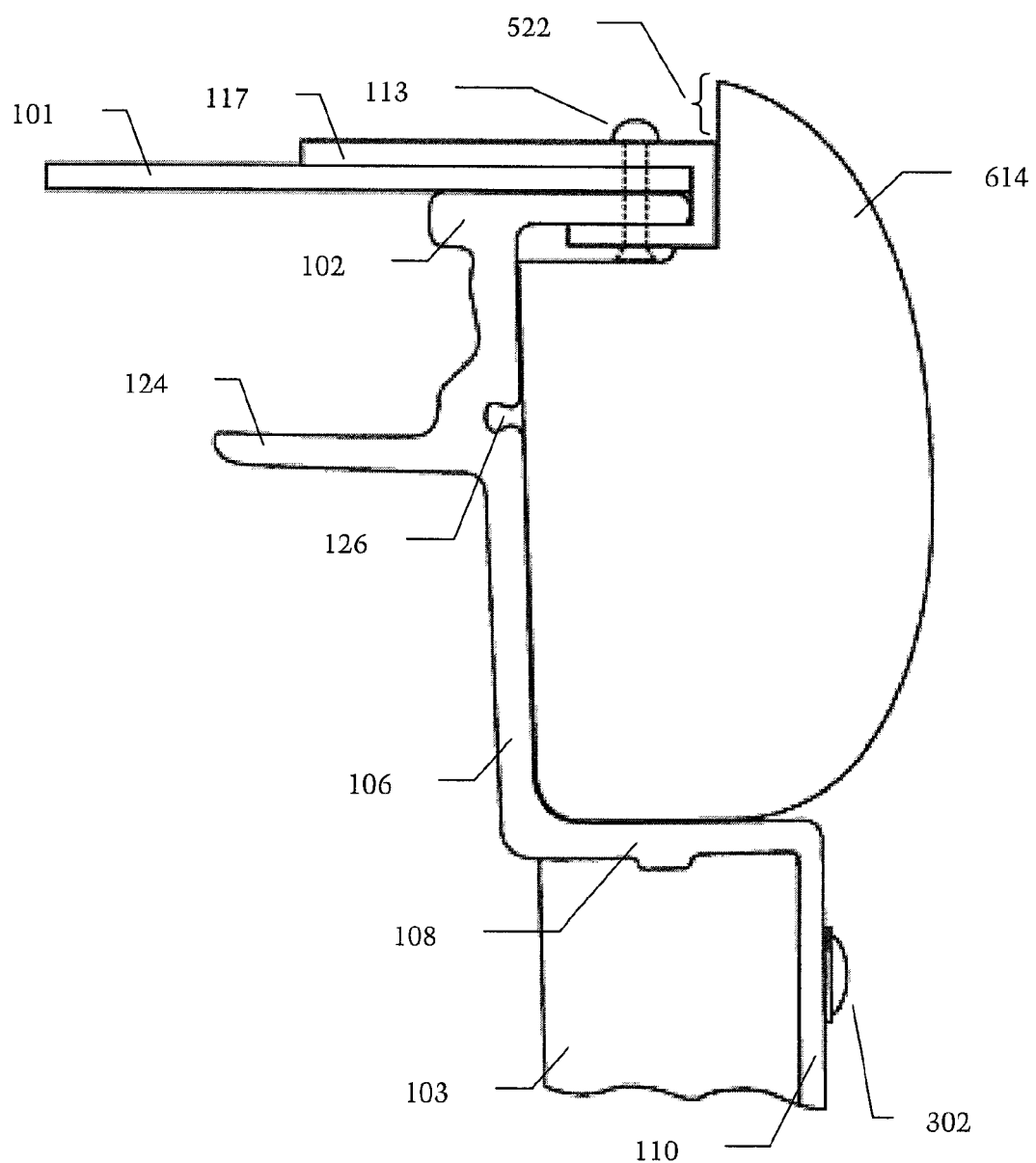
Figure 6E:
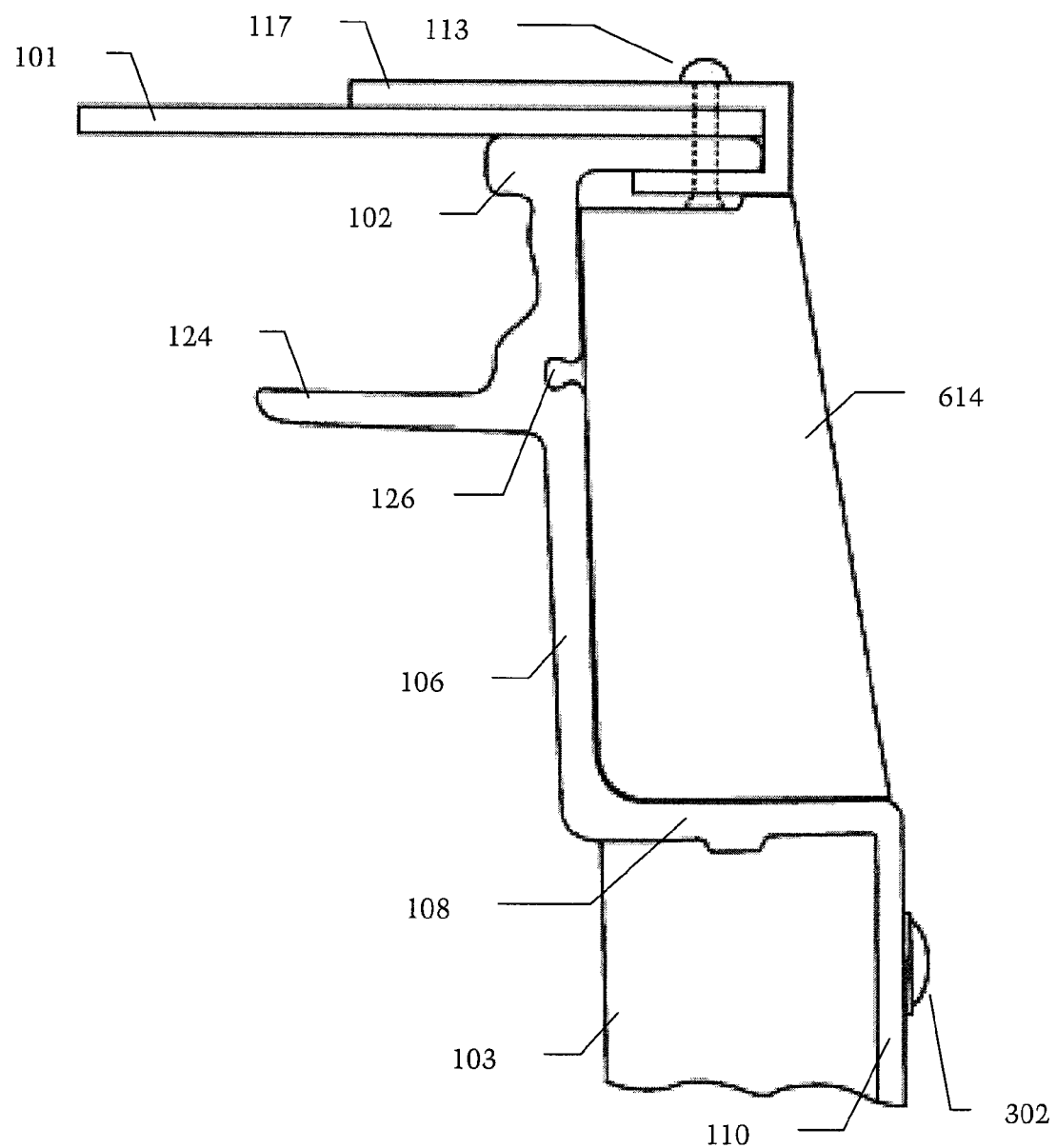
Figure 6F:
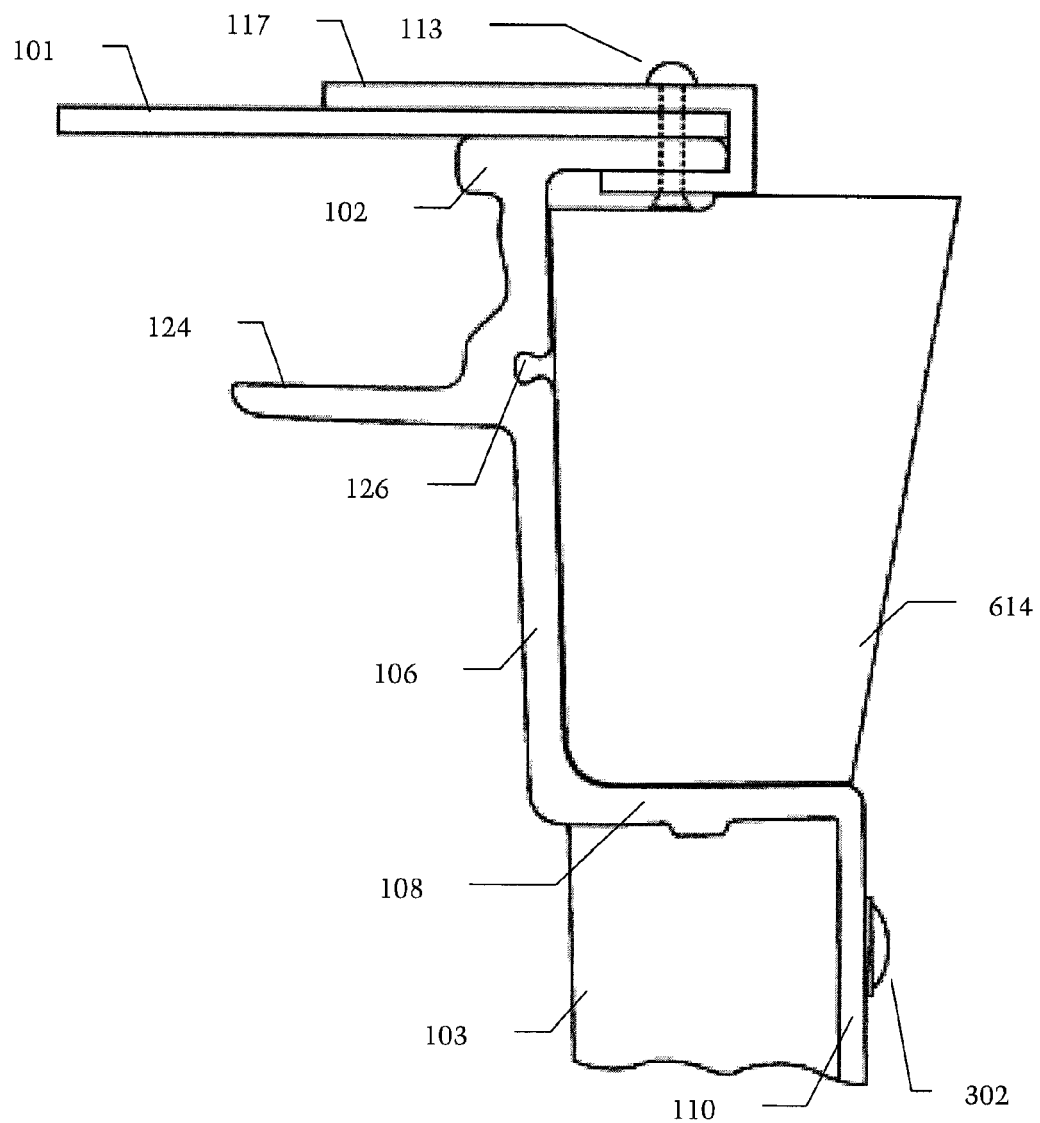

FIGS. 6D-6F depict additional exemplary embodiments wherein the support structure comprises a support block 614. In FIG. 6D, support block 614 has a rounded outer face exhibiting a convex shape that protrudes past bottom lip 108. In FIG. 6E, support block 614 has a slanted outer face such that the bottom portion of the block extends further out laterally than the top portion. In FIG. 6F, support block 614 has a slanted outer face such that the top portion of the block extends laterally further out than the bottom portion. Optionally, these shaped blocks 614 may include a portion that extends vertically above the top lip. FIG. 6D depicts an example of this where section 522 of the block 614 extends above the top lip 102.

Figure 7A:
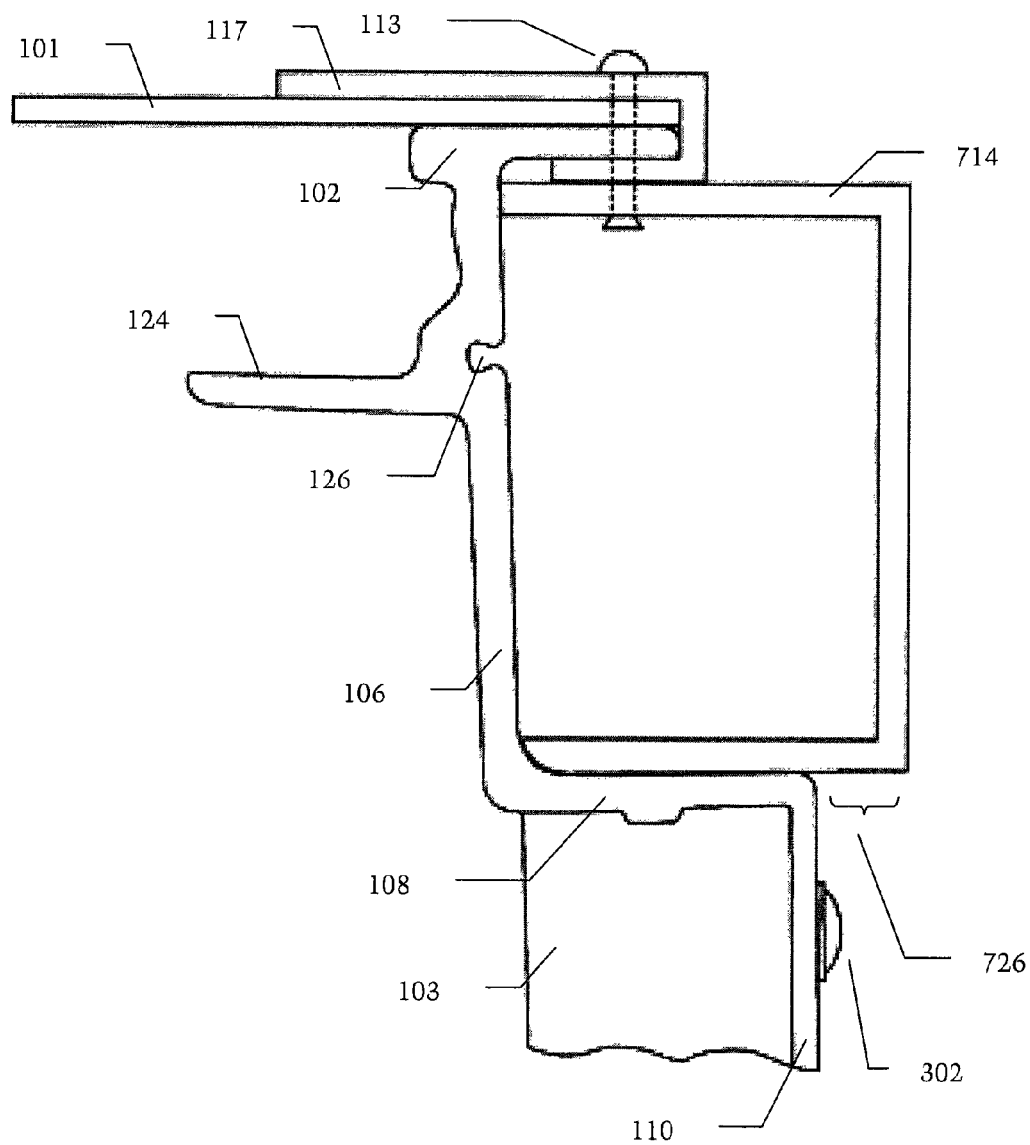
FIGS. 7A-7C depict cross-sectional views of exemplary top rail embodiments comprising exemplary support rails.
Figure 7B:
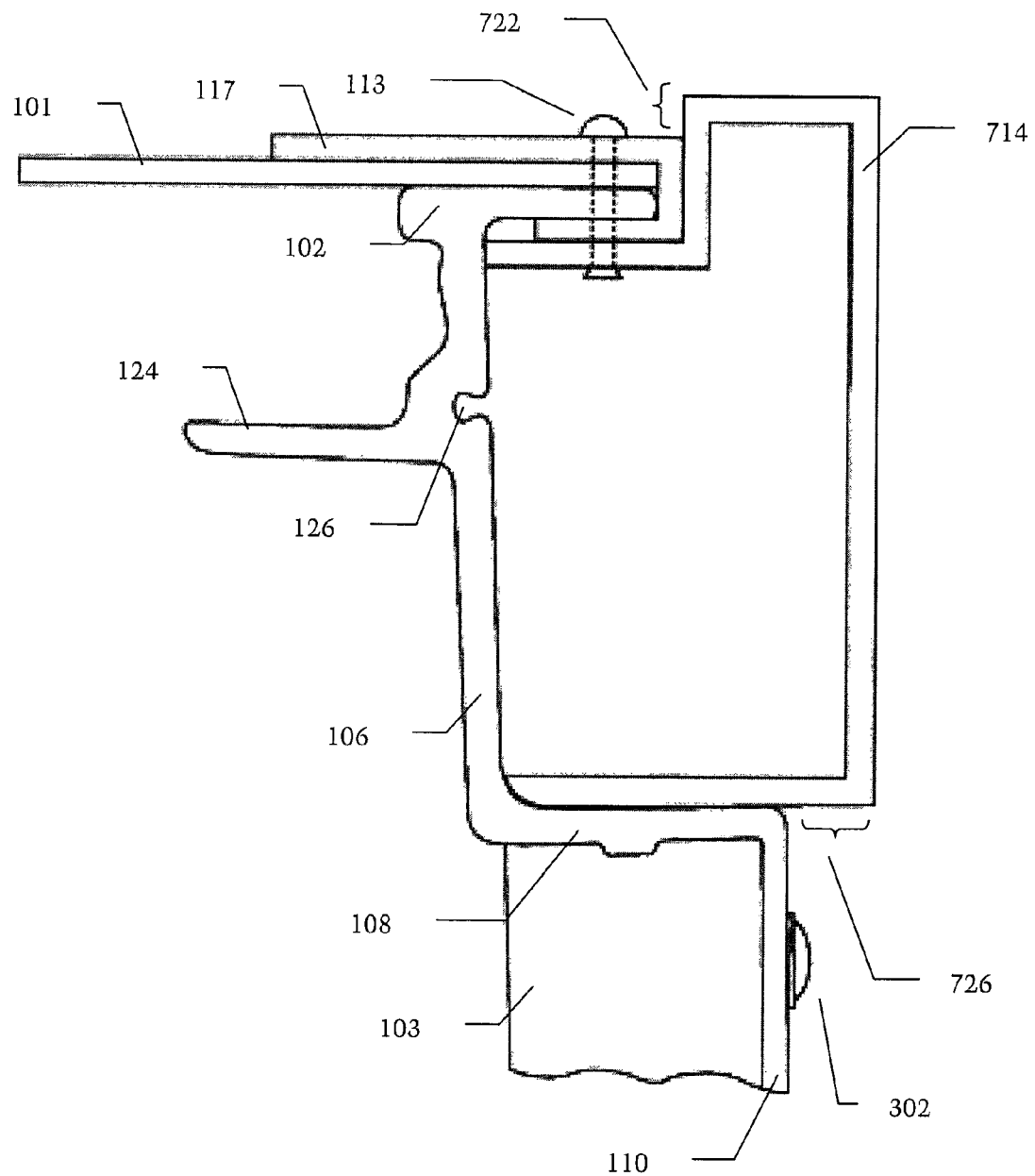
Figure 7C:
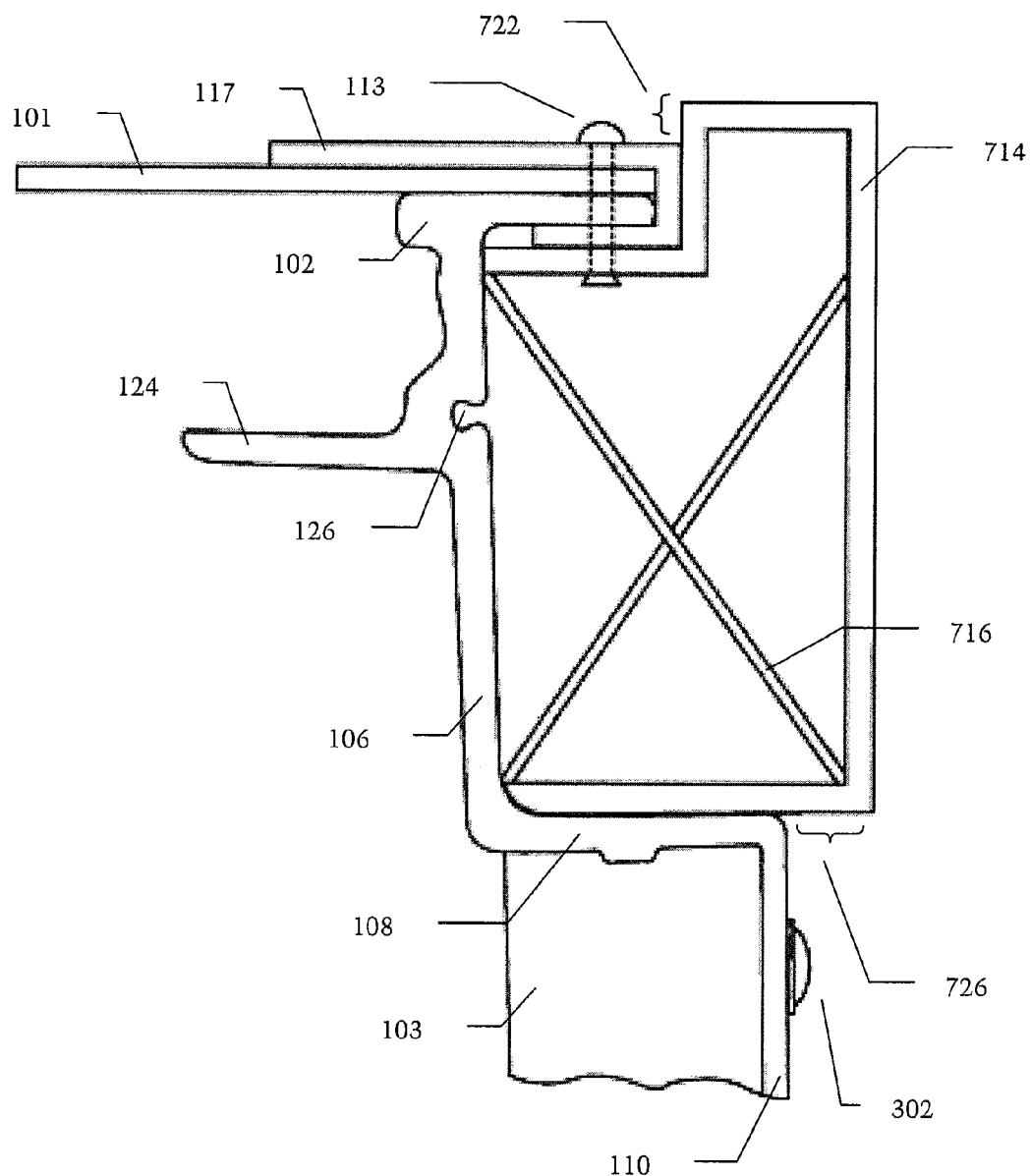

FIGS. 7A-7C depict additional exemplary embodiments wherein the support structure comprises a support rail 714. Support rail 714 may be made of metal, e.g. aluminum, or any other material having a strength sufficient to support the top lip 102 against tree branch strikes from above. In FIG. 7A, support rail 714 exhibits a general C shape in the cross-section such that its C is positioned oppositely facing the C of the cavity channel 104. Rivet 113 pierces the top portion of support rail 714, and thus rivet 113 helps to hold the support rail in place. Support rail 714 may additionally (or alternatively) be held in place by adhesives, bolts, or other fastening means as is well known in the art. In the embodiments of FIGS. 7A-7C, support rail 714 extends laterally outward past the bottom lip 108 of the top rail 100, thereby providing additional protection for low-profile light source 302 which is disposed on the bottom wall 110 of the top rail 100. The inventors also believe that the low-profile light source may be disposed on the support rail 714 itself (similar to the placement shown in, e.g., FIG. 4B). In the embodiment of FIG. 7B, the support rail 714 extends upwardly past the top of the J-shaped piece 117 and rivet 113 by a distance 722, thereby providing additional protection for top lip 102, J-shaped piece 117, and container body roof 101 (similar to the protection provided by the support blocks having an upward extension as shown in, e.g., FIGS. 5A and 5B). In the embodiment shown in FIG. 7C, the support rail further comprises reinforcing members 716. Reinforcing members 716 could be made of metal (e.g. aluminum) or other material having a strength sufficient to reinforce the support rail against impacts.

Figure 8A:
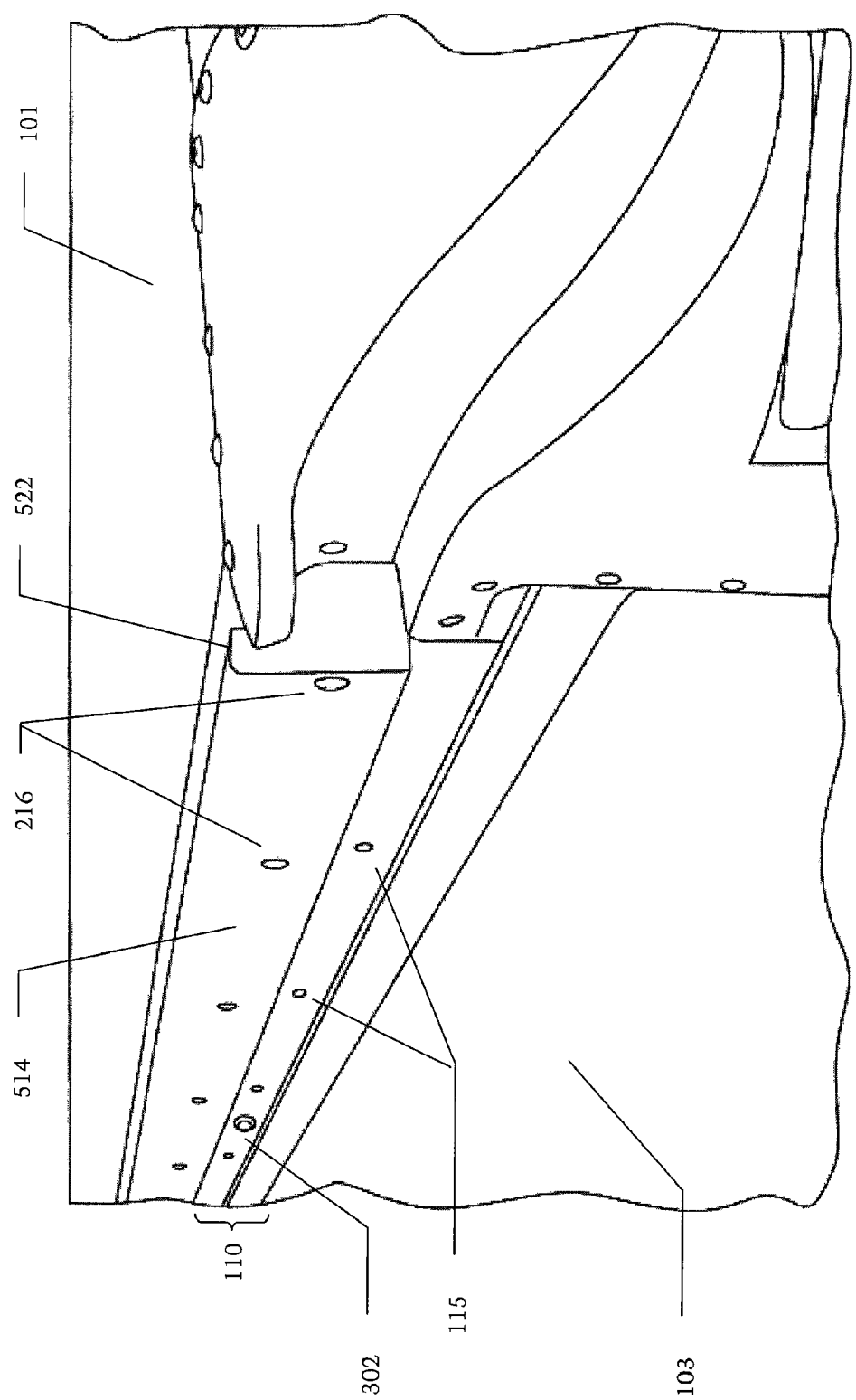
FIGS. 8A-8D depict perspective views of exemplary top rails and lighting arrangements, as installed on an exemplary truck container body, according to embodiments of the present invention.
Figure 8B:
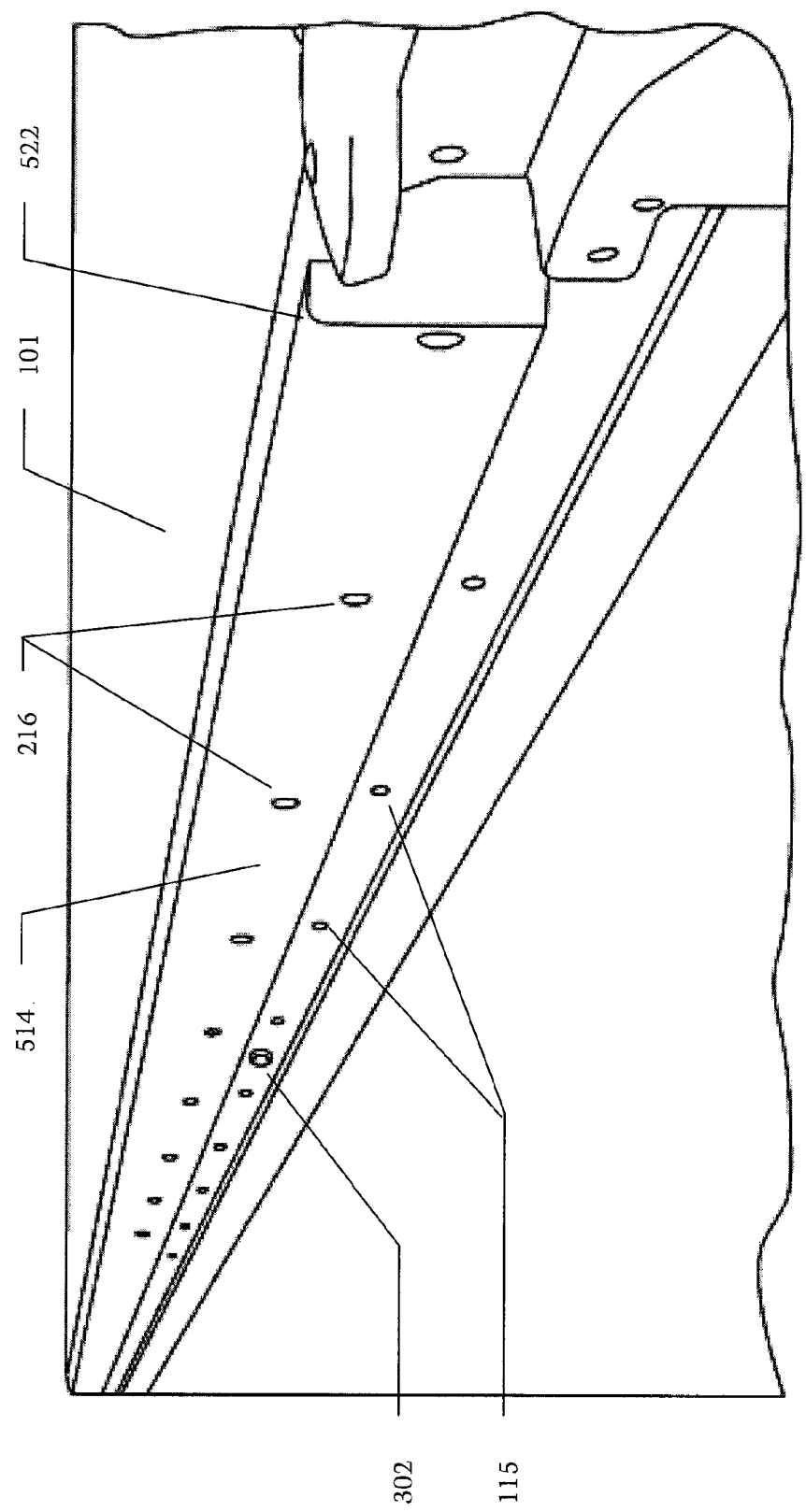
Figure 8C:
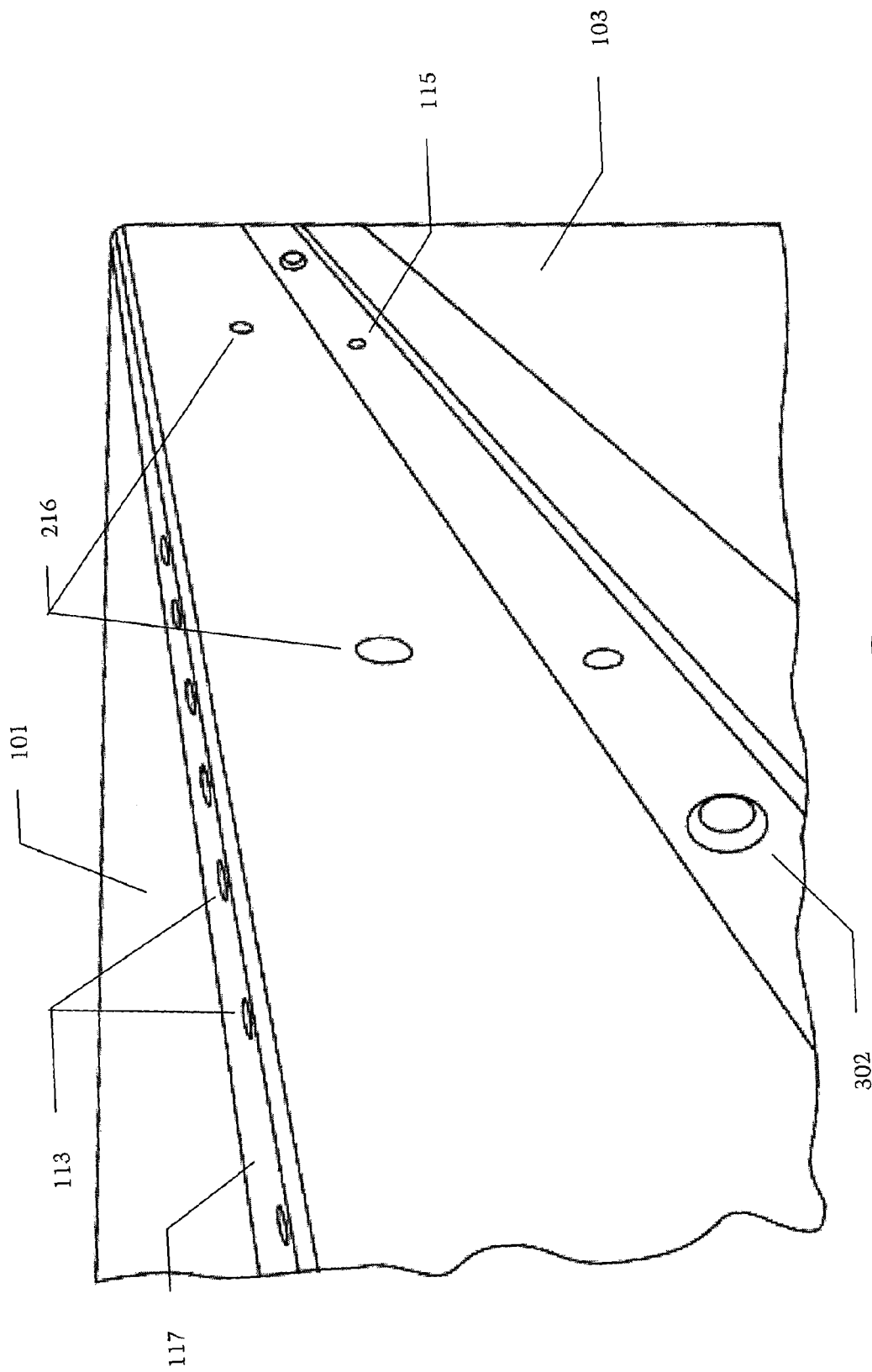
Figure 8D:
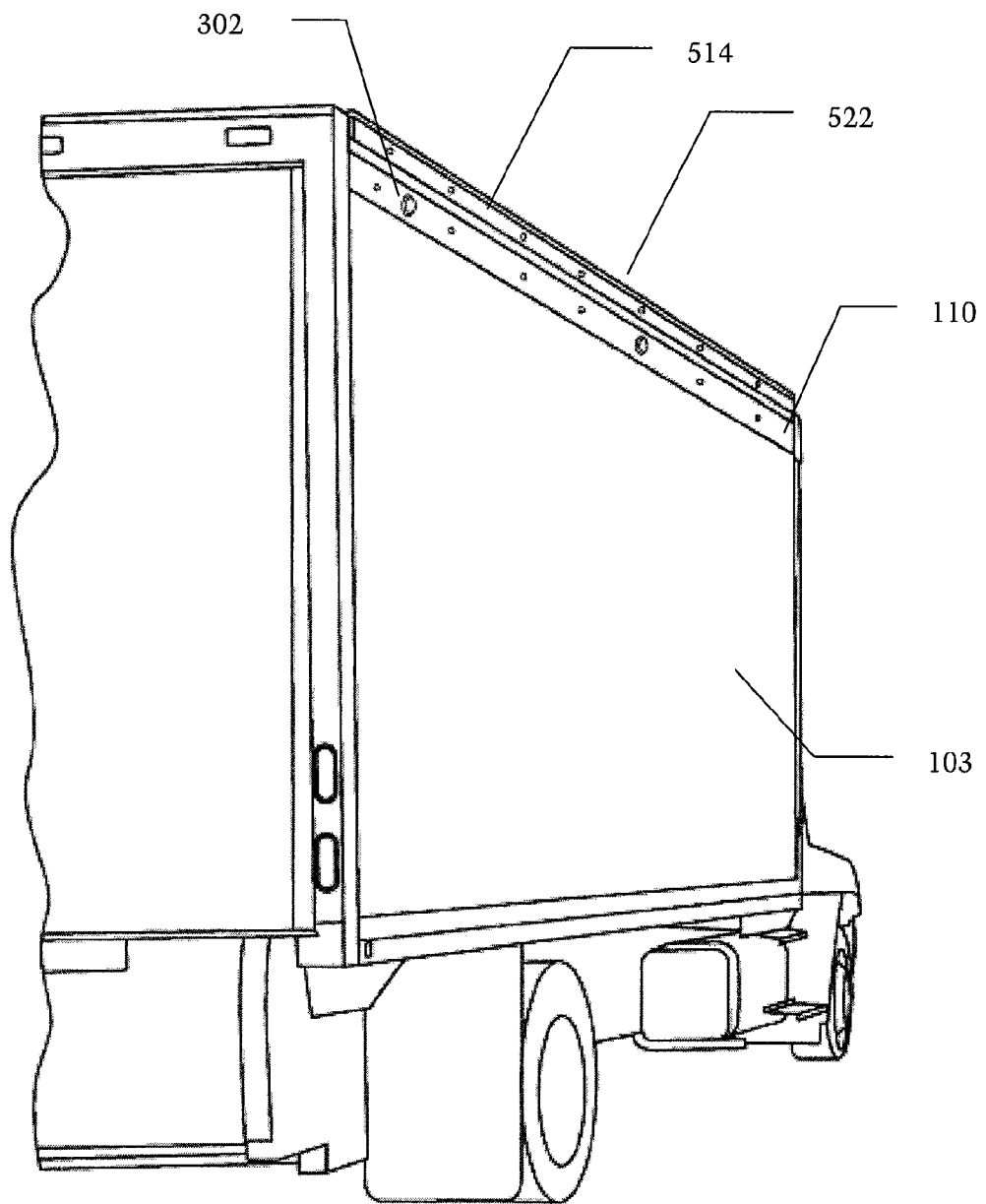

FIGS. 8A-8D depict various views of an exemplary top rail embodiment (such as top rail 500) installed on the container body of a typical truck, with the truck container body's roof 101 and sidewall 103 shown in combination with the top rail. FIG. 8D shows a wide rear view of the exemplary top rail embodiment of FIGS. 5A-C. As can be seen in FIGS. 8A-8D, support block 514 extends horizontally along the length of the truck container body to a rear portion of the truck container body.

Figure 10:
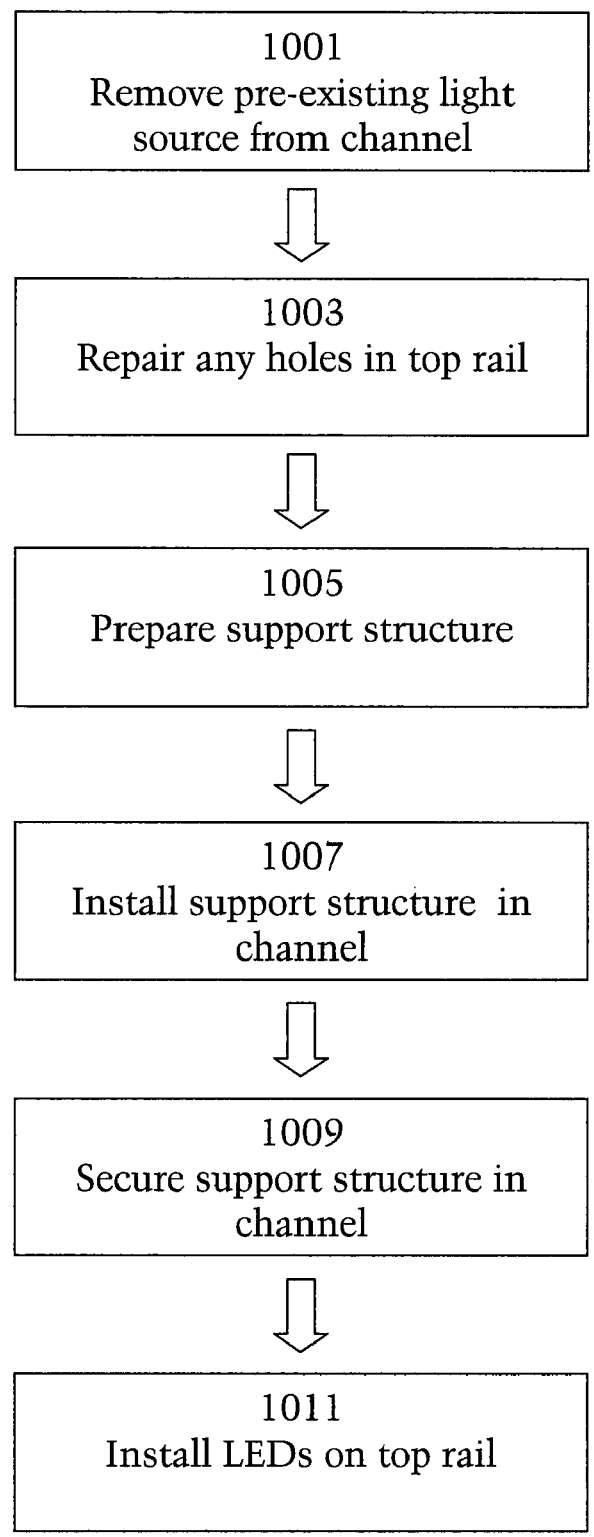
FIG. 10 depicts a flow chart for retrofitting a prior art top rail according to an exemplary embodiment to improve its damage resistance.

The inventors believe that the top rail according to the embodiments disclosed herein may optionally be retro-fitted into existing top rails such as the top rails shown in FIGS. 1A-1G. FIG. 10 depicts an exemplary process flow for such retro-fitting. At step 1001, the top rail's pre-existing light source 112 is removed from channel 104. Preferably, any holes left behind (e.g. wiring, bolt, or rivet holes) are filled in with a water-tight sealant at step 1003. Various sealants are well-known in the industry. Then, at step 1005, a support structure, such as support block 214, 514 or 614, or support rail, such as support rail 714, is prepared for installation. This preparation may include applying adhesive, applying sealant, shaping the block or rail to fit snugly in the channel (e.g. cutting a notch 220), drilling holes for bolts and/or LEDs, etc. At step 1007, the support structure is installed within channel 104. At step 1009, the installed block is secured in place using any of the techniques described herein, such as bolts, rivets, adhesives, etc. Finally, at step 1011, a plurality of low profile light sources such as LED units 302 are secured to the top rail, e.g., along bottom wall 110. In this way, an improved top rail can be created to provide greater protection against impacts such as tree limb strikes.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof. It should be understood that the embodiments disclosed herein include any and all combinations of features as disclosed herein and/or described in any of the dependent claims.

APPENDIX A

Technical Specifications of EVERGAIN ® composite material

Physical and Mechanical Properties

| | | |
|---|---|---|
| 1. Specific Gravity | ASTMD2395 | 1.07-1.10 |
| 2. Abrasion Resistance | ASTMD2394 | 0.01"/1000 rev |
| 3. Compression (parallel) | ASTMD198 | 2,635 psi |
| 4. Compression (perpendicular) | ASTMD198 | 3,864 |
| 5. Tensile Strength | ASTMD198 | 1,189 psi |
| 6. Shear Strength | ASTMD143 | 1,010 |
| 7. Modulus of Rupture | ASTMD4761 | 2,547 |
| 8. Modulus of Elasticity | ASTMD4761 | 361,999 psi |
| 9. Hardness | ASTMD143 | 1,200 lbs |
| 10. Nail Withdrawal | ASTMD1761 | 145 lbs/in |
| 11. Screw Withdrawal | ASTMD1761 | 435 lbs/in |
| 12. Water Absorption (sanded) | ASTMD1037 | 1.60% |
| 13. Water Absorption (unsanded) | ASTMD1037 | 1.05% |
| 14. Coefficient of friction-wet | ASTMD2047 | 0.96 |
| 15. Coefficient of friction-dry | ASTMD2047 | 0.88 |

Durability

| | | |
|---|---|---|
| 16. Fungal Resistance- White Rot | ASTMD1413 | No Decay |
| 17. Fungal Resistance- Brown Rot | ASTMD1413 | No Decay |
| 18. Termite Resistance | ASTMD3345 | Rating = 9.6/10 |

Thermal

| | | |
|---|---|---|
| 19. Thermal Expansion | ASTME228 | $20.7 \times 10^{-6}$ (in/in/f) |

Fire

| | | |
|---|---|---|
| 20. Self Ignition Temperature | ASTMD1929 | 874 degrees |
| 21. Flash Ignition Temperature | ASTMD1929 | 834 degrees |
| 22. Flame Spread | ASTME84 | 126.32 |

What is claimed is:

1. A top rail for a container body, the top rail comprising:
   a top lip;
   a channel wall connected to the top lip;
   a bottom lip connected to the channel wall such that the top lip, channel wall, and bottom lip define a channel; and
   a support structure disposed at least partially within the channel, wherein the support structure comprises a support block, and wherein the support block comprises a portion extending vertically above the top lip.

2. The top rail of claim 1 wherein the support block comprises a composite material block.

3. The top rail of claim 2 wherein the composite material comprises a natural material and a synthetic material.

4. The top rail of claim 1 wherein the support block exhibits a perpendicular compression strength of at least 1000 pounds per square inch.

5. The top rail of claim 1 wherein the block exhibits a perpendicular compression strength of at least 3000 pounds per square inch.

6. The top rail of claim 1 wherein the support block comprises a hollow cavity.

7. The top rail of claim 1 wherein an outer surface of the support block has a convex shape.

8. The top rail of claim 1 wherein an outer surface of the support block has a slanted shape such that a bottom portion of the support block extends further out laterally than a top portion of the support block.

9. The top rail of claim 1 wherein the support block comprises a water-resistant support block.

10. The top rail of claim 1 wherein the support block is sized and shaped to snugly engage at least a portion of the top lip, the channel wall and the bottom lip.

11. The top rail of claim 1 wherein the support block extends laterally outward from the top lip.

12. The top rail of claim 1 wherein the support block extends laterally outward from the top lip and the bottom lip.

13. The top rail of claim 1 further comprising a low profile light source disposed on an outwardly-facing surface of the support structure.

14. The top rail of claim 13 wherein the support structure comprises a support block, the support block having a recess in the outwardly-facing surface, and wherein the low profile light source is disposed within the recess.

15. The top rail of claim 1 wherein the support structure comprises a support rail.

16. The top rail of claim 1 wherein an extruded metal structure comprises the top lip, the channel wall and the bottom lip.

17. The top rail of claim 1 further comprising a container body connected to the top rail.

18. The top rail of claim 17 wherein the container body comprises:
   a container roof; and
   a container sidewall substantially perpendicular to the container roof;
   wherein the container roof is substantially parallel to the top lip and wherein the container sidewall is substantially parallel to the channel wall.

19. The top rail of claim 18 wherein the container body comprises a truck container body.

20. The top rail of claim 18 further comprising:
   a bottom wall connected to the bottom lip, wherein the bottom wall is substantially perpendicular to the bottom lip;
   wherein the container roof is connected to the top lip; and
   wherein the container sidewall is connected to the bottom wall.

21. A top rail for a container body, the top rail comprising:
   a top lip;
   a channel wall connected to the top lip;
   a bottom lip connected to the channel wall such that the top lip, channel wall, and bottom lip define a channel; and
   a support structure disposed at least partially within the channel, wherein the support structure comprises a support block, and wherein an outer surface of the support block has a slanted shape such that a top portion of the support block extends further out laterally than a bottom portion of the support block.

22. A top rail for a container body, the top rail comprising:
   a top lip;
   a channel wall connected to the top lip;
   a bottom lip connected to the channel wall such that the top lip, channel wall, and bottom lip define a channel; and
   a support structure disposed at least partially within the channel, wherein the support structure comprises a support block;
   a bottom wall connected to the bottom lip, wherein the bottom wall is substantially perpendicular to the bottom lip; and
   a low-profile light source disposed on an outward-facing surface of the bottom wall.

23. The top rail of claim 22 further comprising a fastener having a fastener body and a fastener head, the fastener body being disposed in the bottom wall such that the fastener head is disposed on the outward-facing surface of the bottom wall less than one sixth of one inch from the low-profile light source.

24. A top rail for a container body, the top rail comprising:
a top lip;
a channel wall connected to the top lip;
a bottom lip connected to the channel wall such that the top lip, channel wall, and bottom lip define a channel; and
a support structure disposed at least partially within the channel, wherein the support structure comprises a support block, wherein the support block extends laterally outward from the top lip and the bottom lip;
a bottom wall connected to the bottom lip, wherein the bottom wall is substantially perpendicular to the bottom lip; and
a low-profile light source disposed on the bottom wall.

25. The top rail of claim 24 wherein the low-profile light source comprises a plurality of light-emitting diode (LED) units.

26. The apparatus of claim 24 further comprising a rivet having a rivet head and a rivet body, the rivet body piercing the bottom wall such that the rivet head is disposed on an external surface of the bottom wall adjacent to the low-profile light source.

27. The top rail of claim 26 wherein the distance between the rivet head and the low-profile light source is less than or equal to one sixth of one inch.

28. The top rail of claim 27 wherein the low-profile light source has a substantially circular shape.

29. The top rail of claim 28 wherein the rivet head has a substantially circular shape.

30. The top rail of claim 28 wherein the rivet head has a crescent shape to allow placement immediately adjacent to a low-profile light source.

31. A top rail for a container body, the top rail comprising:
a top lip;
a channel wall;
a bottom lip, wherein the top lip, the channel wall and the bottom lip are positioned to define a channel;
a bottom wall connected to the bottom lip, wherein the bottom wall is substantially perpendicular to the bottom lip; and
a low-profile light source disposed on the bottom wall.

32. The top rail of claim 31 wherein the low-profile light source comprises a plurality of light-emitting diode (LED) units.

33. The top rail of claim 31 further comprising a rivet having a rivet head and a rivet body, the rivet body piercing the bottom wall such that the rivet head is disposed on an external surface of the bottom wall adjacent to the low-profile light source.

34. The top rail of claim 33 wherein the distance between the rivet head and the low-profile light source is less than or equal to one sixth of one inch.

35. The top rail of claim 33 wherein the low-profile light source has a substantially circular shape.

36. The top rail of claim 35 wherein the rivet head has a substantially circular shape.

37. The top rail of claim 35 wherein the rivet head has a crescent shape to allow placement immediately adjacent to the low-profile light source.

38. The top rail of claim 33 further comprising a support structure disposed at least partially within the channel for reinforcing the top lip.

39. The top rail of claim 38 wherein the support structure comprises a support block.

40. The top rail of claim 38 wherein the support structure comprises a support rail.

41. The top rail of claim 38 wherein the support structure comprises a portion extending vertically above the top lip.

42. The top rail of claim 38 wherein the support structure extends laterally outward from the top lip.

43. The top rail of claim 38 wherein the support structure extends laterally outward from the top lip and the bottom lip.

44. The top rail of claim 31 further comprising a container body connected to the top rail.

45. The top rail of claim 44 wherein the container body comprises:
a container roof; and
a container sidewall substantially perpendicular to the container roof;
wherein the container roof is substantially parallel to the top lip and wherein the container sidewall is substantially parallel to the bottom wall.

46. The top rail of claim 45 wherein the container body comprises a truck container body.

47. The top rail of claim 45 wherein the container roof is connected to the top lip, and wherein the container sidewall is connected to the bottom wall.

* * * * *